United States Patent [19]
Poole

[11] Patent Number: 5,591,964
[45] Date of Patent: Jan. 7, 1997

[54] OPTICAL POWER METER USING LOW-POWER MEASUREMENT CIRCUIT

[76] Inventor: Craig D. Poole, 8 Wemrock Dr., Ocean, N.J. 07712

[21] Appl. No.: 438,843

[22] Filed: May 11, 1995

[51] Int. Cl.$^6$ .................................................... G02B 6/26
[52] U.S. Cl. ...................................... 250/227.14; 385/32
[58] Field of Search ...................... 250/227.14, 227.11, 250/227.24, 227.16; 359/109, 173, 188; 385/32, 48

[56] References Cited

U.S. PATENT DOCUMENTS

| | | | |
|---|---|---|---|
| 4,768,854 | 9/1988 | Campbell et al. | 385/48 |
| 5,039,188 | 8/1991 | Williams | 250/227.16 |
| 5,080,506 | 1/1992 | Campbell et al. | 385/29 |

*Primary Examiner*—Stephone Allen
*Attorney, Agent, or Firm*—Peter L. Michaelson; Michaelson & Wallace

[57] ABSTRACT

A battery or solar-powered apparatus for measuring and displaying optical power transmitted through an optical fiber. The apparatus has a measuring circuit comprising an optical detector (602), a current/voltage converter (704) and a control circuit (702) which provides timing signals and controls the power applied to the measuring circuit. The apparatus is secured within a housing (102) and is sufficiently small and light such that permanent, in-line attachment to the optical fiber is possible. In a first embodiment, a voltage proportional to the measured optical power is available at an output jack (214) attached to the housing (102). The jack further comprises a switch (1760) which enables power to the apparatus during a measurement period. An alternative embodiment comprises an analog/digital converter (1202) which provides a digital representation of the measured optical power. Low-power displays, such as liquid crystal displays (112, 312), provide direct visual output of the digitized representation of the measured optical power, selectably in units of dBm/dB.

23 Claims, 13 Drawing Sheets

OPTICAL POWER METER USING LOW-POWER MEASUREMENT CIRCUIT

FIELD OF THE INVENTION

This invention relates to apparatus for measuring and displaying optical power being carried by an optical fiber and, particularly to an optical power meter utilizing a low-power measurement circuit.

BACKGROUND OF THE INVENTION

Fiber optic transmission systems transmit information from one location to another by sending optical energy through glass fiber. Information is encoded on the energy by modulating either its power or spectrum. In these systems it is often necessary to monitor the average optical power being carried by a transmission fiber. Average optical power is a useful indicator of system performance, and thus is often used for maintenance and control purposes.

Known means for measuring optical power in a fiber use one of two methods. The simplest method is to break the optical path by disconnecting one end of an active fiber from a system. Preferably this is done at a site where the fiber is connectorized and thus easily removable. The disconnected fiber end is inserted into an optical power meter. Optical energy in the fiber under test passes out of the fiber end and enters the power meter for measurement. After a measurement is completed, the fiber is then reconnected to the system.

While this method is simple, the requirement of having to break the optical path and thus interrupt system operation during measurement is a severe limitation in commercial systems carrying traffic. In addition, the need to disconnect and then reconnect the test fiber each time a measurement is made can degrade the optical connection between test fiber and system, resulting in a loss of optical energy from the system.

A second known method for measuring optical power carried by a fiber avoids having to disrupt system operation during measurement by inserting a fiber optic tap into the optical path. The fiber optic tap extracts a small fraction of optical power from the optical path and delivers it to a power meter for measurement. Since most of the optical energy passes through the tap undisturbed, the transmission system under test continues to operate normally while a measurement is made. The ratio of optical power removed by the tap to the optical power remaining in the test fiber is defined as the tap ratio. Because this ratio is fixed, optical power removed by the tap can be used as a measure of optical power carried by the test fiber.

Known fiber optic taps suitable for use in this measurement method include multi-port devices such as fused fiber couplers (see for example U.S. Pat. No. 5,251,277 issued to D. Young on Oct. 5, 1993), and temporary taps made by bending the transmission fiber to scatter out optical energy. An example of the latter type of tap is described in U.S. Pat. No. 5,127,724 issued to S. James, D. Ferguson, D. Drouet, S. Hornung on Jul. 7, 1992.

Measurement of optical power using the above mentioned optical taps suffer from several important limitations. For example, fiber optic devices that serve as taps are by necessity three-port devices (see for example, Chapter 26, "Photonic Local Networks", by I. P. Kaminow of *Optical Fiber Telecommunications II*, Edited by S. E. Miller, and I. P. Kaminow, Academic Press, Inc. Boston, Mass. 1988, pages 940–943). Optical energy must enter the device through an input port and exit through two output ports. Performing a single power measurement thus requires an operator to make three optical connections, each requiring special tools and skill on the part of the operator. The resulting time required to perform each measurement is undesirable when large numbers of fibers need to be measured.

The use of a temporary tap, such as a fiber bend, avoids this problem since the optical tap can be introduced and removed easily. However the temporary tap suffers from poor accuracy owing to a dependence of tap ratio on fiber waveguide design and coating parameters. In addition, a temporary tap is not applicable to cabled fiber since the light scattered out of the fiber can not penetrate the cable jacket.

In addition to the above mentioned limitations, presently known means for measuring optical power in fibers suffer from an additional limitation. Because transmission fibers are often located in the field or widely scattered over a given location, access to commercial electrical power is often difficult. As a result it is often necessary to use portable battery-powered meters to measure optical power. However, known portable meters typically have battery life of less than 100 hours when operated continuously. This makes these meters impractical for long term monitoring of fiber optic transmission lines owing to the need for frequent battery replacement.

Although battery life in known portable meters can be extended by increasing the size of batteries used, this limits the portability of the meters. It is the trade-off between portability and battery life in known portable meters that limits their range of application. For example, the feasibility of integrating a power meter into a fiber optic cable is determined by the maximum weight that the cable and fiber optic connectors can support with out affecting optical loss. For many commercially available fiber optic connectors this maximum weight is as low as 120 grams-weight. Known portable meters exceed this weight limit and thus are not suitable for this application.

SUMMARY OF THE INVENTION

It is an object of the present invention to measure and display the optical power being carried by an optical fiber in a way that is accurate, easy to implement, and suitable for long-term monitoring applications.

The invention accomplishes these objectives by integrating the measuring apparatus into the fiber cable to create an in-line power meter that can be easily installed in fiber optic systems. To achieve the required weight and miniaturization of the measuring apparatus, an inventive low-power measuring circuit is used to greatly reduce the weight and size of batteries needed to power the meter. In addition, by reducing electrical power consumption, the inventive measuring circuit makes possible portable optical power meters with battery life approaching the shelf-life of batteries. In this way battery maintenance is greatly reduced relative to known portable meters.

A further advantage of the low-power measuring circuit is to make feasible alternative means for providing electrical power, for example by using solar cells, thus eliminating in some cases the need for batteries altogether.

In particular and in accordance with my inventive teachings, the present invention provides apparatus for measuring the optical power carried by a fiber, the preferred embodiment comprising means for tapping optical energy from the optical fiber, a low-power measuring circuit for converting the tapped optical energy into a signal voltage, and an A/D circuit for converting the signal voltage into a digital code for indicating optical power on a digital display. According to my inventive technique, the optical tap, electrical circuits and display are permanently attached to a fiber cable. Optical energy entering one end of the fiber cable travels to the optical tap where a small fraction is radiated out, and sent to the measuring circuit. The majority of optical energy passes through the tap to the other end of the fiber cable where it continues on to a fiber system.

According to my inventive technique, the optical tap comprises a permanent microbend induced in the fiber by locally heating an exposed section of the glass fiber to the melting point while holding the fiber in a curved trajectory. The optical tap thus formed continuously radiates a fixed fraction of optical energy out of the fiber to be detected by the measuring circuit.

The inventive measuring circuit comprises a photodiode and current/voltage converter for converting the optical energy tapped out of the fiber into a signal voltage that is proportional to the logarithm of the optical power tapped out. An analog-to-digital (A/D) converter generates a digital representation of the signal voltage that drives a liquid crystal display (LCD) for visual representation of optical power in the units of dBm.

According to my inventive technique, low electrical-power operation of the measuring circuit is achieved by automatically turning off electrical power to the current/voltage converter between A/D conversions. This is done using an inventive switching circuit that preserves measurement sensitivity while achieving a factor of 100 reduction in average electrical power consumed by the measuring circuit.

The preferred embodiment of the invention incorporates an additional sleep mode in which electrical power to the display and A/D circuitry is turned off when optical power in the fiber falls below a predetermined level, thus saving electrical energy when the meter is not in use. According to my inventive teachings, the power meter can be powered by either batteries or solar cells.

An additional embodiment that makes use of my inventive teachings is a hand-held optical power meter that is powered by solar cells.

Since the electrical power consumed by my inventive measuring circuit can be made negligibly small compared to known measuring circuits, battery powered meters made in accordance with my invention will have battery life measured in years. The low maintenance requirements of such devices, and the ease-of-use achieved by integrating the measurement apparatus into the fiber cable, makes feasible new applications such as in-line power meters permanently installed in fiber optic systems.

BRIEF DESCRIPTION OF THE DRAWINGS

The teachings of the present invention can be readily understood by considering the following detailed description in conjunction with the accompanying drawings in which.

To facilitate reader understanding, identical reference numerals are used to denote identical or similar elements that are common to the figures. The drawings are not necessarily drawn to scale.

DETAILED DESCRIPTION OF THE PREFERRED EMBODIMENT

Figure 1:
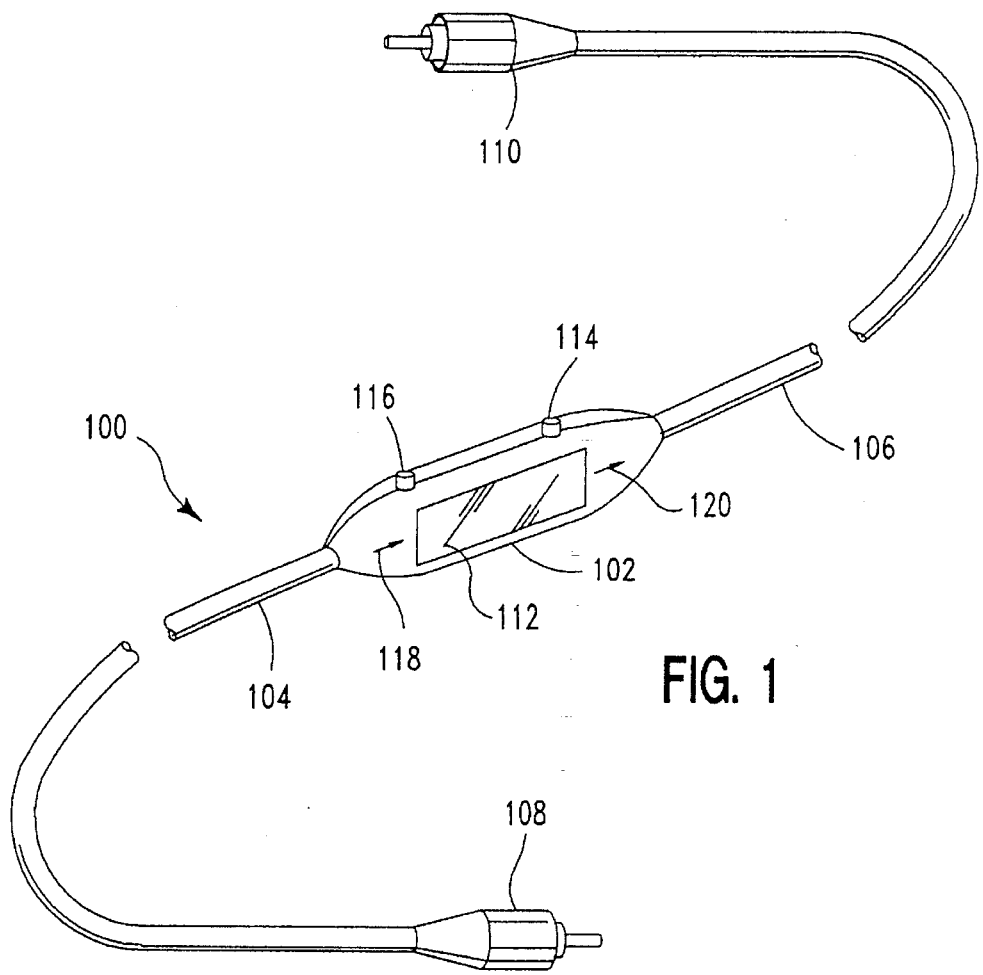
FIG. 1 is a perspective view of the preferred embodiment of the in-line fiber optic power meter according to my invention.

Referring to the drawings, FIGS. 1–6 show pictorially fiber optic power meter 100 comprising rigid meter housing 102, flexible fiber cable leads 104 and 106, and attached optical connectors 108 and 110. Fiber cable leads 104 and 106 comprise protective sheathing and strength members surrounding a central optical fiber 601 (shown in FIG. 6) which optically couples connectors 108 and 110 together. Digital displays 112 and 312 attached to meter housing 102 provide a digital readout of optical power measured in fiber 601 and exiting connector 110. Arrow legends 118, 120, 318, and 320 on meter housing 102 show the proper direction of optical energy flow.

Fiber cable leads 104 and 106 and optical connectors 108 and 110 which are well known in the art, are available commercially from a variety of vendors. One such vender is Siecor Corporation of Hickory, N.C.

Switches 114 and 116 on meter housing 102 control the operation of meter 100. Manual operation of push-button switch 114 alternately initiates power measurement in the units of dBm and dB, the latter providing measurement of optical power relative to an operator-selected reference. Manual operation of slide switch 116 sets the calibration of the meter for calibrated measurement at one of two wavelengths.

Figure 2:
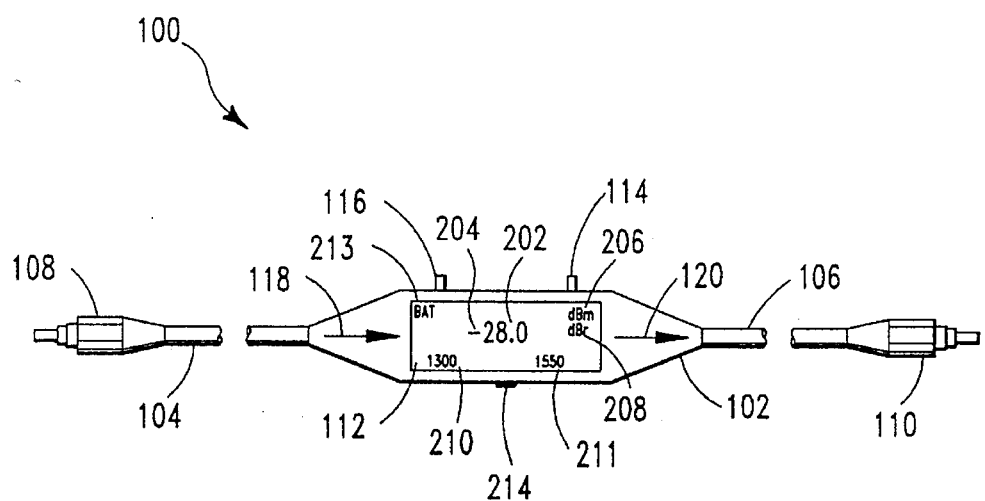
FIG. 2 is a front plan view of the power meter of FIG. 1.
Figure 3:
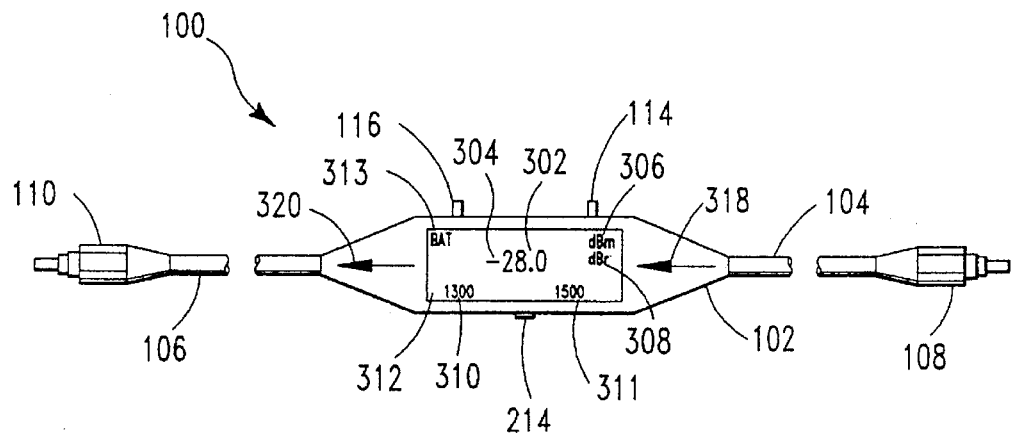
FIG. 3 is a back plan view of the power meter of FIG. 1.
Figure 4:
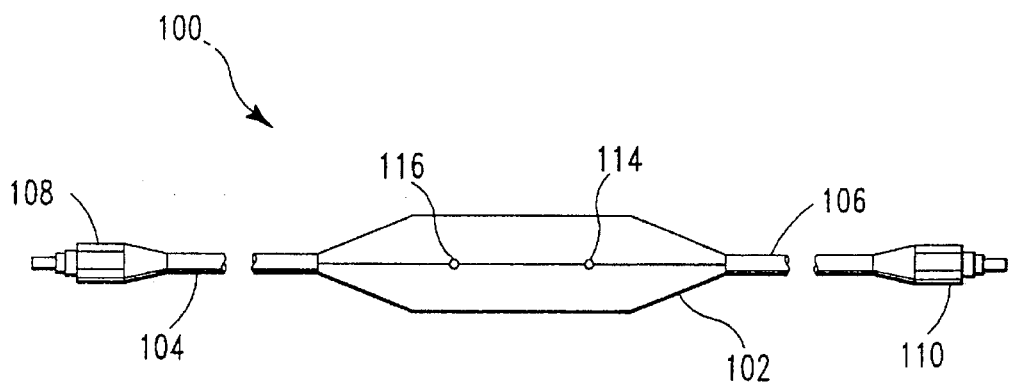
FIG. 4 is a top plan view of the power meter of FIG. 1.

FIGS. 2 and 3 show in detail digital displays 112 and 312, respectively. In the preferred embodiment, the use of two identical displays positioned on opposite sides of meter housing 102 eliminates the need to rotate meter housing 102 in order to view a power reading. Displays 112 and 312 are preferably liquid crystal displays, each comprising 3 digit displays 202 and 302, and sign indicators 204 and 304, for displaying optical power. Additionally, the displays comprise legends 206, 208, 306, and 308 for indicating the measurement mode as selected by switch 114. Legends 210, 211, 310, and 311 on displays 112 and 312 show the calibration wavelength as selected by slide switch 116. Legends 213 and 313 indicate a low battery condition when activated.

Referring to FIG. 2, miniature phone jack 214 on meter housing 102 provides an analog output voltage proportional to the optical power displayed on digital displays 112, and 312. Alternatively, phone jack 214 could provide digitally encoded data representing the optical power displayed on digital displays 112 and 312.

Figure 5:
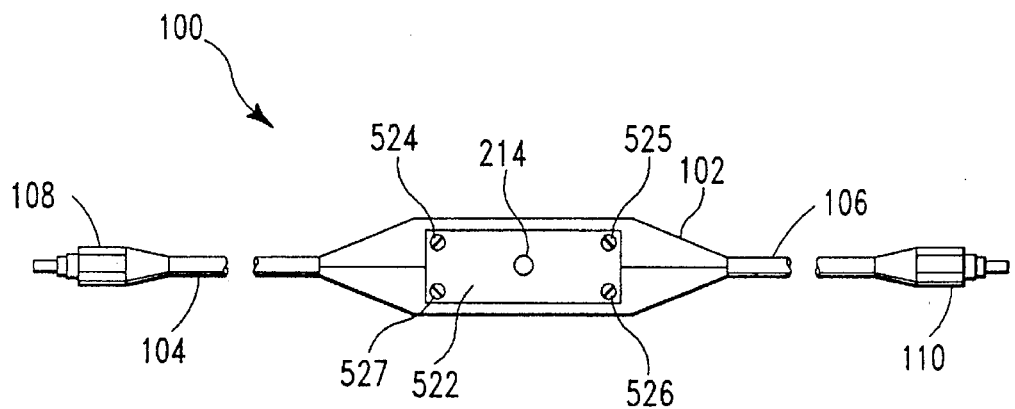
FIG. 5 is a bottom plan view of the power meter of FIG. 1.

FIG. 5 pictorially shows bottom plate 522 which provides access to the inside of meter housing 102 by means of screws 524, 525, 526, and 527 for the purpose of battery replacement.

Figure 6:
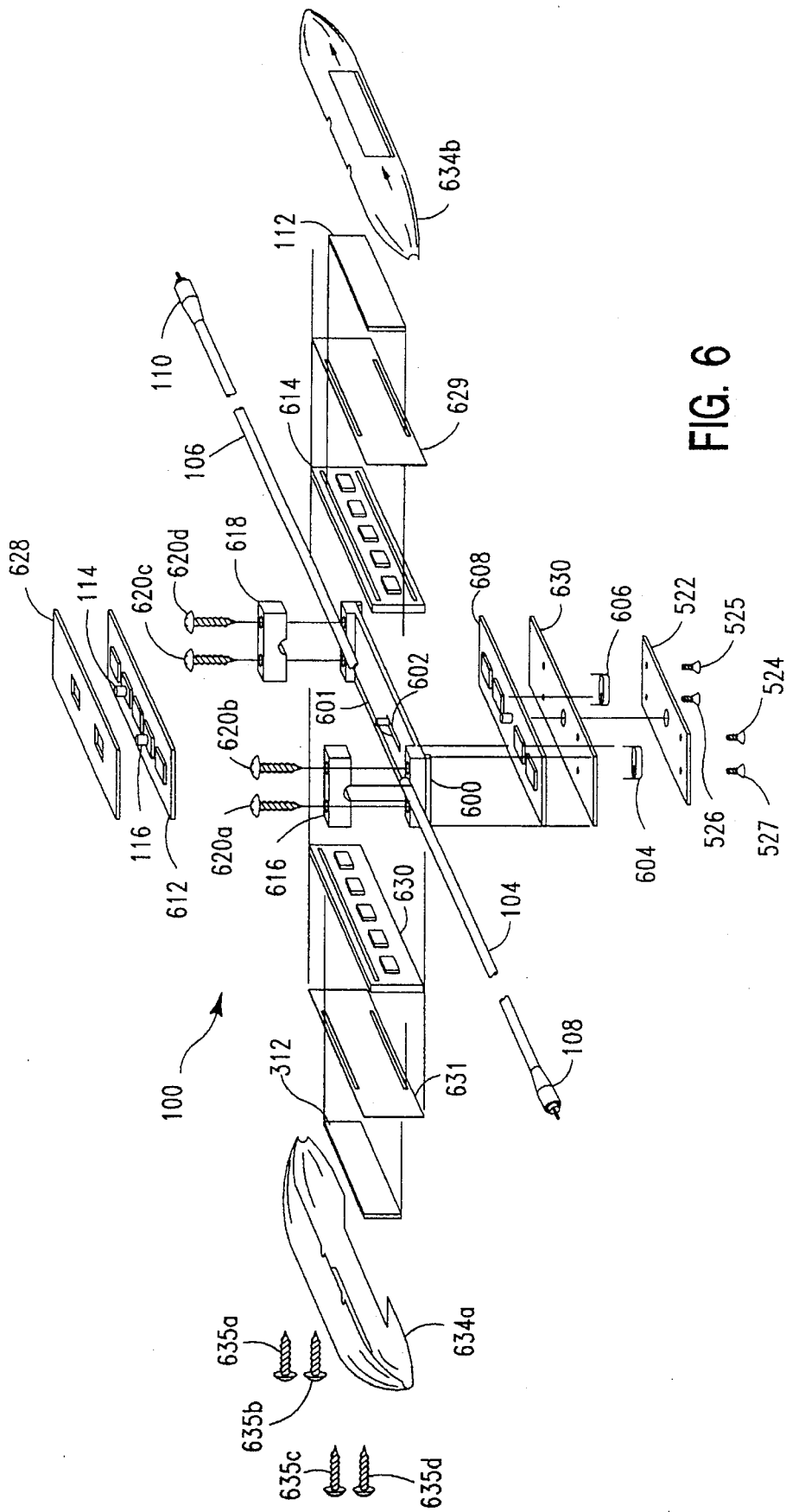
FIG. 6 is an exploded view showing the assembly of the power meter of FIG. 1.

FIG. 6 is an exploded view showing the assembly of meter 100 comprising, in addition to the above mentioned elements, tap module 600, tap/detector assembly 602, coincell batteries 604 and 606, and necessary electrical means in the form of circuit boards 608, 610, 612, and 614, for converting the optical energy removed by tap/detector assembly 602 into a digital readout of optical power on displays 112 and 312. Tap module 600 supports tap/detector assembly 602 and holds fiber cable leads 104 and 106, and fiber 601 in position by means of clamping plates 616 and 618, and securing screws 620a–d.

Aluminum shielding plates 628, 629, 630, and 631 shield components on circuit boards 608, 610, 612 and 614 from ambient electrical noise. Rigid housing covers 634a and 634b, which enclose and support the elements comprising meter housing 102, are secured to each other by means of screws 635a–d. Preferably rigid housing covers 634a and 634b are made of lightweight plastic.

Figure 7:
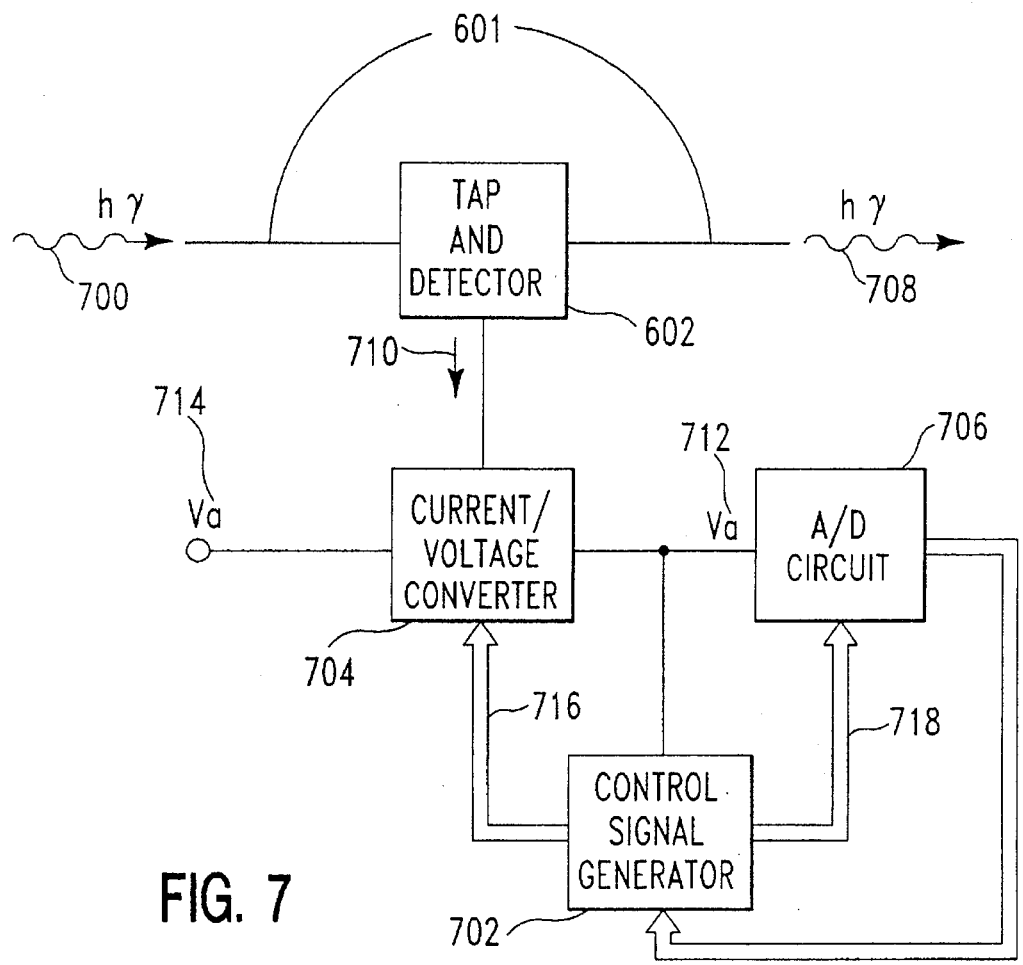
FIG. 7 is a block diagram of an apparatus for measuring optical power according to my invention.

FIG. 7 is a block diagram showing the operation of power meter 100 comprising optical fiber 601, tap/detector assembly 602, current/voltage converter 704, A/D circuit 706, and control signal generator 702. Optical signal 700 enters tap/detector assembly 602 by means of optical fiber 601. Tap/detector assembly 602 removes a fraction of optical signal 700 and generates an electrical current 710 that is proportional to the power of optical signal 700. Transmitted optical signal 708, which represents the optical energy from signal 700 that is not removed by tap assembly 602, travels out of tap/detector assembly 602 and is transmitted by optical fiber 601. Since the power in optical signal 708 is proportional to the power in signal 700, electrical current 710 is also proportional to the optical power in signal 708.

Current/voltage converter 704, in response to current 710 and control signals 716 from control signal generator 702, generates signal voltage 712 and analog voltage 714. Signal voltage 712 and analog voltage 714 are both proportional to the logarithm of current 710, and thus are also proportional to the logarithm of optical signals 700 and 708. Preferably the numerical value of analog voltage 714, when expressed in the units of millivolt, exactly equals the numerical value of optical power in signal 708 when the latter is expressed in the units of dBm.

A/D circuit 706, in response to signal voltage 712 and control signals 718, performs analog-to-digital (A/D) conversion of signal voltage 712. The resulting digital representation of signal voltage 712 is displayed by digital displays 112 and 312 of FIGS. 2 and 3 respectively, to provide a visual representation of optical power of optical signal 708.

Control signal generator 702 controls meter operation by means of control signals 716 and 718. These signals turn off electrical power to various circuit elements between A/D conversions to reduce electrical power consumption, and provide timing signals to A/D circuit 706 for A/D conversion of signal voltage 712.

Tap/Detector Assembly

Figure 8:
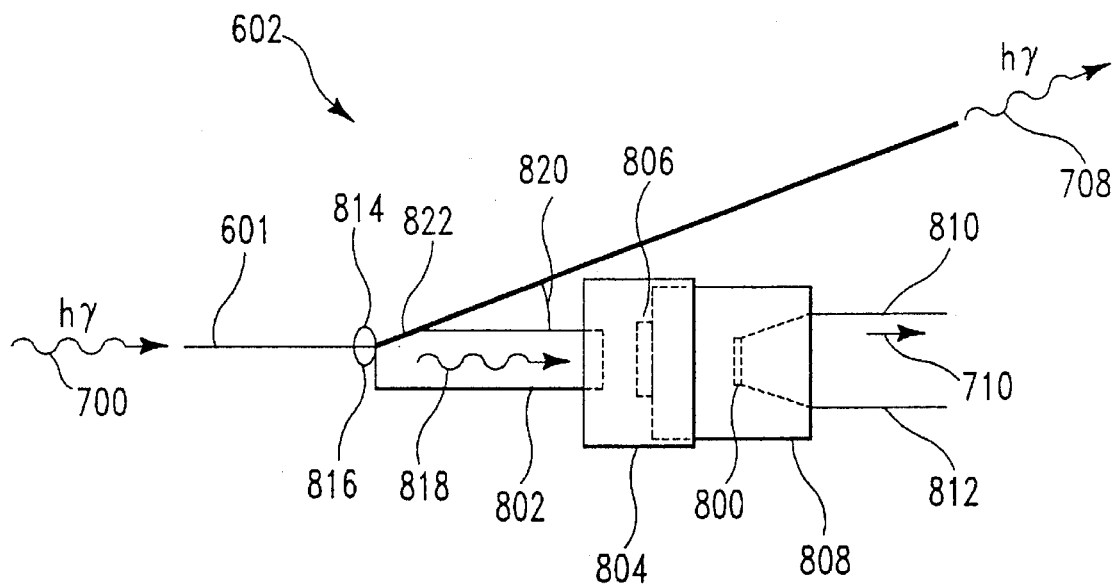
FIG. 8 pictorially shows a tap and detector assembly of the apparatus of FIG. 7.

FIG. 8 shows tap/detector assembly 602, comprising optical fiber 601, optical tap 814, graded-index lens 802, lens mount 804, optical filter 806, photodetector housing 808, photodetector 800, and electrical leads 810 and 812. Optical signal 700 propagating through fiber 601 is partially scattered out by optical tap 814 which is formed by inducing a permanent microbend in fiber 601. Epoxy 816 secures optical tap 814 in position on an optical axis (not shown) of graded-index lens 802. Preferably, epoxy 816 has a refractive index equal to the material comprising fiber 601 so that reflections at the fiber-epoxy interface are minimized.

Graded-index lens 802 collects and focuses optical energy 818 scattered out of fiber 601 by optical tap 814 and directs it through optical filter 806 and onto the surface of photodetector 800. Photodetector 800, in response to optical signal 818, generates an electrical current 710 that is proportional to the magnitude of optical signal 818.

In the preferred embodiment of the present application, optical filter 806 is an interference filter used to compensate for the wavelength dependence of optical tap 814. Preferably filter 806 has transmission-versus-wavelength response that is complimentary to the wavelength dependence of the tap ratio of optical tap 814. In alternative embodiments of the invention, filter 806 could be used to tailor the spectral response of the meter by using other filter characteristics. For example, filter 806 could be designed as a passband filter in order to block unwanted wavelengths from being detected by photodetector 800.

Graded-index lens 802, lens mount 804, filter 806, and photodetector housing 808 are joined together by suitable means such as epoxy adhesive so as to form a rigid assembly, thereby maintaining optical alignment among the elements. Preferably the seals between graded-index lens 802, lens mount 804 and photodetector housing 808 is hermetic so that filter 806 is not exposed to ambient moisture.

Graded-index lens 802 includes an angled bevel 822 ground onto a top surface of the lens at the input end. Bevel 822 allows optical tap 814 to be aligned with the optical axis of lens 802 while maintaining a fixed distance from the end surface of lens 802. Preferably the bevel angle should be equal to the bend angle 820 of optical tap 814 so as to minimize mechanical stresses on fiber 601 and tap 814.

Figure 9:
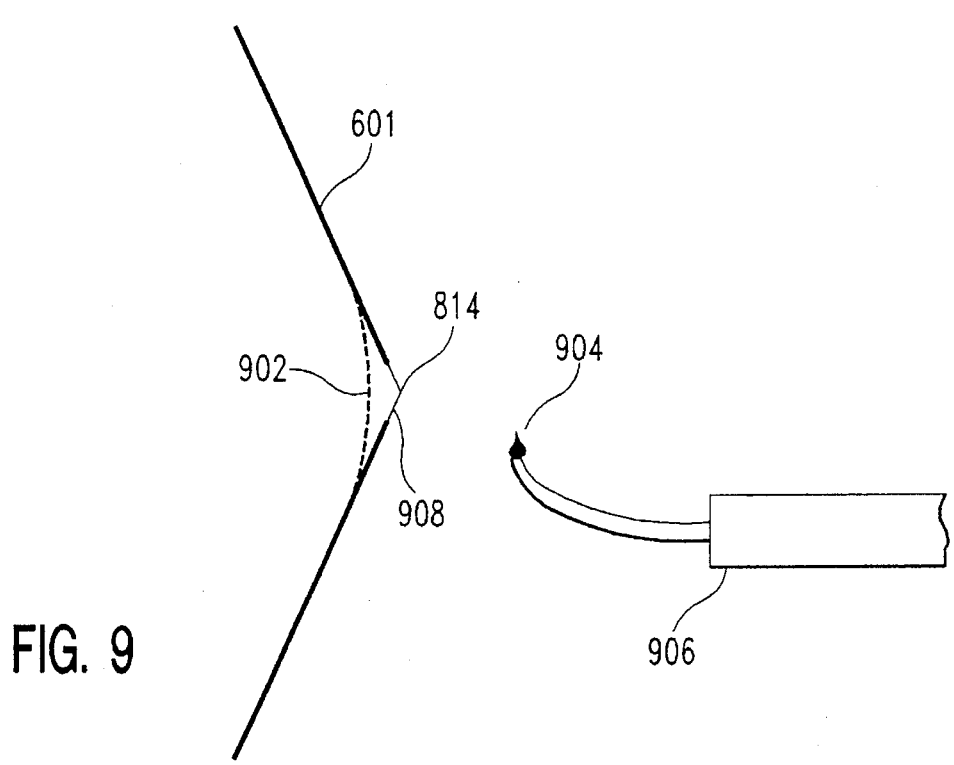
FIG. 9 pictorially shows a means for making the optical tap of FIG. 8.

FIG. 9 shows the preferred means for making optical tap 814 of FIG. 8. Prior to forming the optical tap, a short section 908 of fiber 601 is stripped of its epoxy jacket to expose the glass fiber underneath. The fiber is held at points on either side of exposed fiber section 908 and bent so that the fiber follows curved trajectory 902. Flame 904 from microtorch 906 momentarily heats the glass near the midpoint of the exposed section of fiber, thereby locally raising the temperature of the glass to its melting point and releasing stress within the bent glass. The release of stress at the point where the glass melts causes fiber 601 to assume a V-shape as shown in FIG. 9. At the location where the fiber is heated to its melting point, a small radius bend is produced that scatters light out of the fiber. The radius of the bend is determined by the size and temperature of the torch flame. Preferably the bend radius is made as small as possible, and not greater than 2 mm, so as to facilitate collection of the light radiated out of the tap and to minimize wavelength dependence in the tap ratio.

During the process of heating the fiber, optical loss through fiber 601 is monitored. The flame is removed when the desired tap ratio is achieved. By varying flame size, heating time, and radius of curvature of starting bend 902, any desired tap ratio may be achieved. For example, a standard 125 micron fused silica fiber held in an 8 cm radius bend will produce a 1 dB tap ratio (25% light scattered out) when exposed to a 1 mm acetylene/oxygen flame for approximately 0.25 seconds.

After formation, optical tap 814 is secured to tap/detector assembly 602 with epoxy as shown in FIG. 8. Preferably the exposed section of fiber 908 is completely encapsulated in epoxy so as to minimize exposure of the glass to environmental contaminants.

It should be noted that the torch flame shown in FIG. 9 is intended to be exemplary of means for applying heat in a spatially confined way. Alternative means for heating the fiber include irradiation with a laser beam and heating with a small radio-frequency coil.

Electrical Circuit Operation

Figure 10:
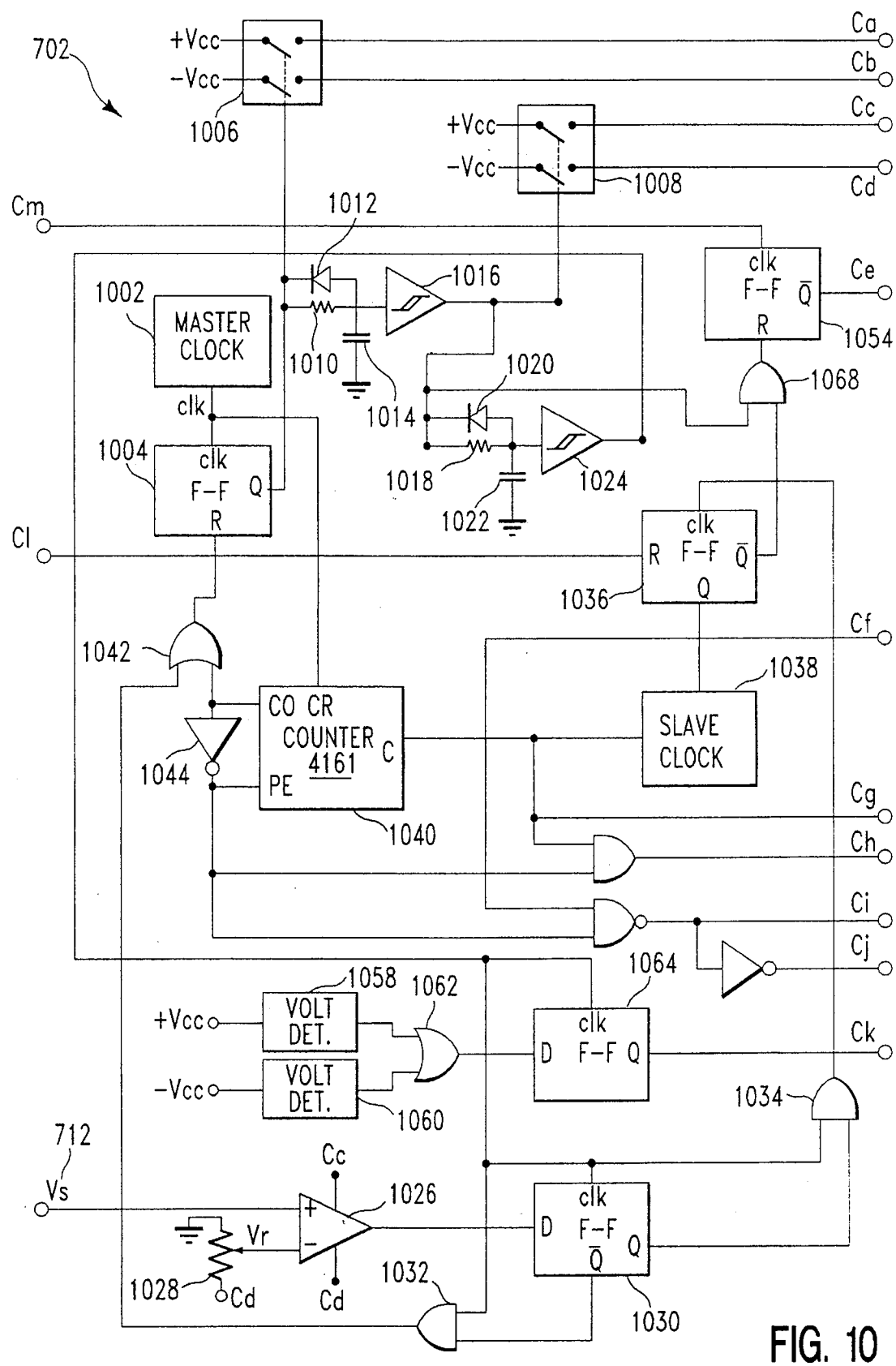
FIG. 10 is a schematic diagram of a control signal generator of FIG. 7.
Figure 11:
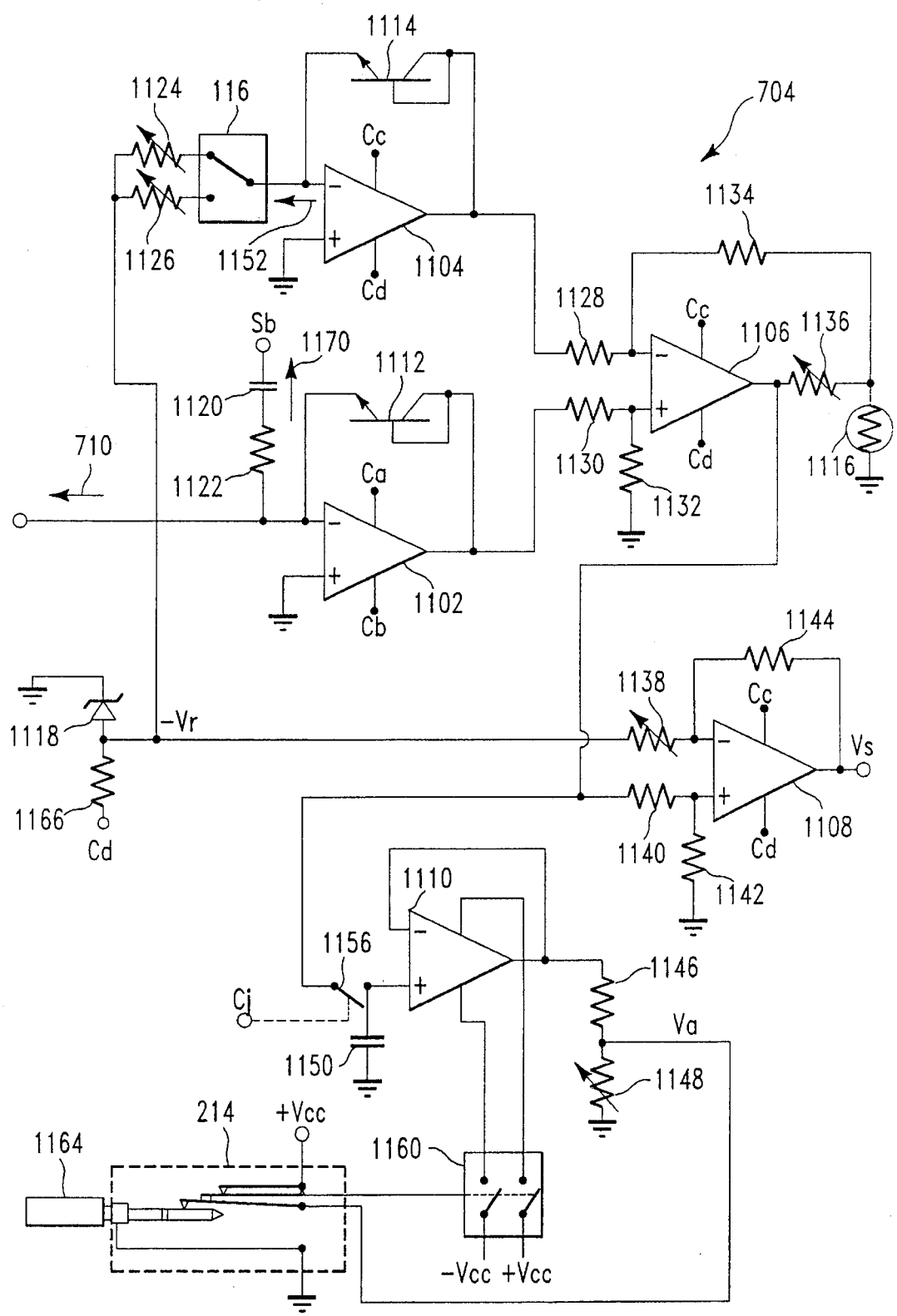
FIG. 11 is a schematic diagram of a current/voltage converter of FIG. 7.
Figure 12:
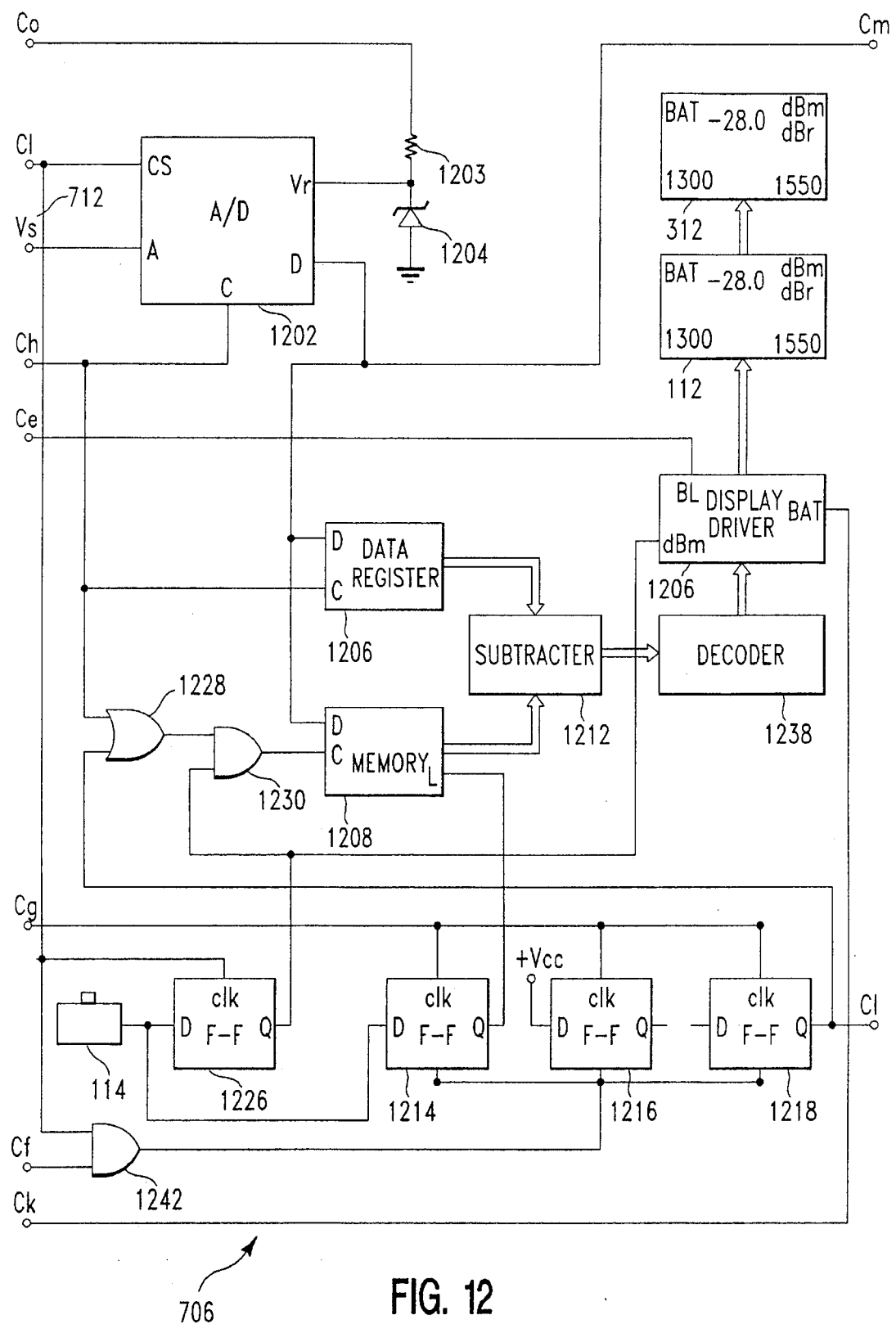
FIG. 12 is a schematic diagram of an A/D circuit of FIG. 7.

FIGS. 10, 11, and 12 are schematic drawings showing the operation of control signal generator 702, current/voltage converter 704, and A/D circuit 706, respectively. While considering the following detailed descriptions of these circuits, reference should be made to FIG. 13, which is a diagram showing the relative timing of control signals.

FIG. 10 is a schematic diagram of control signal generator 702 of FIG. 7. As already described, the purpose of control signal generator 706 is to control the timing and delivery of electrical power to current/voltage converter 704 and A/D circuit 706. The timing function is served by clocks 1002 and 1038, the former clock being the master clock and the latter a slave.

A measurement cycle begins when the output of clock 1002 goes high driving flip-flop 1004 into a high output state. The output of flip-flop 1004 closes analog switch 1006, causing control signals Ca and Cb to assume voltage levels equal to the positive and negative supply voltages +Vcc and −Vcc, respectively.

In parallel with switch 1006, the output of flip-flop 1004 charges capacitor 1014 through resistor 1010. After a time delay determined by the RC time constant of capacitor 1014 and resistor 1010, the output of Schmitt trigger 1016 goes high closing analog switch 1008. This causes control signals Cc and Cd to assume voltage levels equal to the supply voltages +Vcc and −Vcc, respectively. Control signals Ca and Cb, together with their time-delayed counterparts Cc and Cd supply electrical power to current/voltage converter 704 as will be described in more detail below.

After being powered on by control signals Ca, Cb, Cc, and Cd, current/voltage converter 704 delivers signal voltage 712 to the input of comparator 1026. Comparator 1026 compares signal voltage 712 to reference voltage Vr to determine if optical power is present at the detector. If signal voltage 712 exceeds reference voltage Vr, the output of comparator 1026 goes high. The output of the comparator is then clocked into flip-flop 1030 when the output of Schmitt trigger 1024 goes high following a delay time determined by the RC time constant of resistor 1018 and capacitor 1022.

The output of flip-flop 1030 drives gate 1034 high, thereby sending a clock signal to flip-flop 1036. This drives the output of 1036 high and turns on clock 1038. The output of clock 1038, which oscillates at a frequency higher than clock 1002, advances counter 1040 until, after a predetermined number of clock cycles, the carry output of counter 1040 goes high resetting flip-flop 1004 by means of gate 1042. At the same time the output of inverter 1044 goes low causing the counter to cease counting. Resetting flip-flop 1004 causes switches 1006 and 1008 to open in rapid succession, due to the discharge of capacitor 1014 through diode 1012. The opening of switches 1006 and 1008 turns power off to current/voltage converter 704. At the same time, the output of Schmitt trigger 1024 is driven low by the discharge of capacitor 1022 through diode 1020.

During a time when counter 1040 is advancing, signal voltage 712 which is generated by current/voltage converter 704 is sampled by A/D circuit 706 and A/D conversion commences. As will be described in more detail below, when counter 1040 ceases counting, A/D circuit 706 has finished sampling signal voltage 712. Thus turning the power off to current/voltage converter 704 after counter 1040 ceases counting saves electrical power with out affecting the measurement.

Clock 1038 continues to oscillate until the A/D conversion is completed by A/D circuit 706, at which time control signal Cl is received from the A/D circuit resetting flip-flop 1036 and turning off clock 1038. A measurement cycle is completed when the output of clock 1002 goes low resetting counter 1040. A new measurement cycle begins with the output of clock 1002 once again going high.

The description just given applies to the case where signal voltage 712 exceeds reference voltage Vr, thus turning on comparator 1026. When the optical power being measured falls below a predetermined level this condition will not be met, and the output of comparator 1026 will remain low. In this case the measurement cycle is interrupted since clock 1038 is never turned on nor A/D conversion initiated. Comparator 1026, together with resistor 1028, flip-flop 1030, and gates 1032 and 1034 thus comprise a sleep circuit that automatically powers down selected circuit elements when the meter is not in use so as to save electrical energy.

When signal voltage 712 is out of range of the A/D converter, the digital displays are blanked by means of control signal Ce, which is derived from the output of flip-flop 1054. When Ce is low the display is turned off. This condition occurs when control signal Cm from A/D circuit 706 fails to clock flip-flop 1054 into a high state. Signal Cm is taken from the data output of the A/D converter and makes a low to high transition only when the signal voltage falls with in the acceptable measurement range of the A/D converter. Other wise this signal remains low, leaving flip-flop 1054 in a low state with the display turned off. Blanking the display under this condition indicates to the operator that the optical signal is out of range of the meter.

Voltage detectors 1058 and 1060 monitor the status of power supply batteries 604 and 606 of FIG. 6. When the magnitude of either supply voltage +Vcc or −Vcc falls below a predetermined level, the output of the corresponding voltage detector goes high driving gate 1062 high. This high state is clocked into flip-flop 1064 the next time Schmitt trigger 1024 goes high. Control signal Ck, which is taken from the output of flip-flop 1064, is sent to A/D circuit 706 to activate the low-battery legend on the digital displays.

Aside from the control signals already described, control signal generator 702 generates additional control signals Cf, Cg, Ch, Ci, and Cj. These signals are used to control A/D conversion of signal voltage 712 as described in the discussion of A/D circuit 706 below.

FIG. 11 shows a schematic diagram of current/voltage converter 704. The purpose of current/voltage converter 704 is to produce signal voltage 712 and analog output voltage 714 shown in FIG. 7. Both voltages are proportional to the logarithm of photocurrent 710 and are generated by means of a four-stage amplifier circuit comprising operational amplifiers 1102, 1104, 1106, and 1110, and matched transistors 1112 and 1114.

Specifically, amplifier 1102 together with feedback transistor 1112, produces an output voltage proportional to the logarithm of current 710. A second reference voltage is generated at the output of amplifier 1104 by means of reference current 1152 and feedback transistor 1114. Preferably transistors 1112 and 1114 have identical electrical and thermal characteristics. The magnitude of reference current 1152 is controlled by voltage reference diode 1118 and resistor 1166, and either resistor 1124 or resistor 1126. One of the latter two resistors is manually selected by means of slide switch 116. Wavelength calibration of meter 100 is adjusted by means of variable resistors 1124 and 1126, which are preset to provide accurate measurement at two pre-selected wavelengths.

The output voltages from amplifiers 1102 and 1104 drive a differential amplifier stage comprising operational amplifier 1106, thermistor 1116 and resistors 1128, 1130, 1132, 1134, and 1136. Thermistor 1116 has temperature coefficient suitable to compensate for the temperature dependence of transistors 1112 and 1114. Signal voltage 712 is derived from the output of amplifier 1106 and is proportional to current 710.

According to my inventive technique, electrical power consumption is minimized by turning electrical power on to amplifiers 1102, 1104, and 1106 for a time period just sufficient for their output voltage to stabilize prior to sampling of output voltage 712 by A/D circuit 706. When the sampling of signal voltage 712 is completed, the amplifiers are immediately turned off. Because the amplifiers are on for only a short time during a measurement cycle, considerable electrical energy is saved.

The inventive switching technique makes use of the fact that the settling time of signal voltage 712 is limited by the settling time of amplifier 1102. This is particularly true for small optical signal levels when the impedance of transistor 1112 can exceed 100 Megohms. This impedance, together with parasitic capacitance, limits the response time of amplifier 1102. In addition, when the amplifier is initially turned on, transistor 1112 is turned off, producing an even larger initial feedback resistance that causes amplifier 1102 to go into saturation. This further lengthens the settling time of amplifier 1102.

The settling time of amplifier 1102 is reduced by using an inventive settling circuit comprising capacitor 1120 and resistor 1122. When supply voltages Ca and Cb are turned on, current 1170 temporarily flows through capacitor 1120, resistor 1122 and transistor 1112. Current 1170 prevents amplifier 1102 from going into saturation by forcing transistor 1112 to turn on rapidly. The total time during which current 1170 flows is short compared to the time interval during which amplifier 1102 is turned on and is determined by an RC time constant of capacitor 1120 and resistor 1122. Depending upon the magnitude of current 710, the introduction of temporary current 1170 can reduce the settling time of amplifier 1102 by a factor of ten. As a result, the electrical power consumed by amplifier 1102 is reduced by the same factor.

Figure 13:
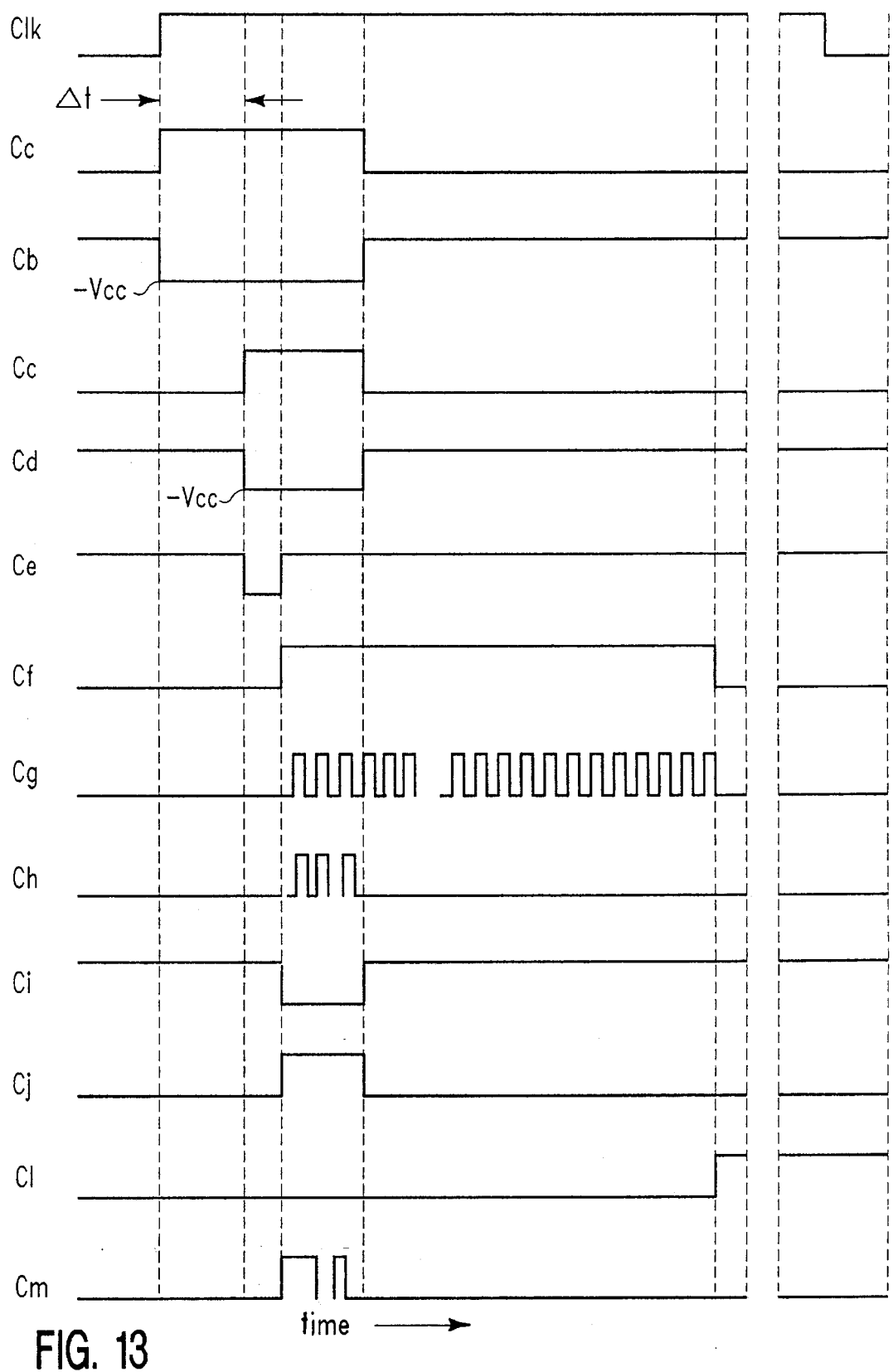
FIG. 13 is a timing diagram showing control signals generated by control signal generator and A/D circuit of FIGS. 11 and 12, respectively.

Electrical power to amplifiers 1104 and 1106 is supplied by control signals Cc and Cd. Since these amplifiers have faster settling times than amplifier 1102, the delivery of electrical power to amplifiers 1104 and 1106, as controlled by control signals Cc and Cd, is delayed in time relative to the delivery of electrical power to amplifier 1102 by control signals Ca and Cb. The time delay Δt between the turning on of power to amplifiers 1104 and 1106, and the turning on of amplifier 1102 is shown in FIG. 13. Preferably this delay time is adjusted so that the output voltages of all of the amplifiers become stable at the same time. In this way the total time that amplifiers 1104 and 1106 are turned on, and thus the electrical power consumed, is minimized.

Analog output voltage 714 is generated by a sample and hold circuit comprising amplifier 1110, analog switch 1156, capacitor 1150 and resistors 1146 and 1148. Normally switch 1156 is open. However, when control signal Cj goes high just after the output of amplifier 1106 has settled, switch 1156 closes and the voltage on capacitor 1150 is made equal to signal voltage 712. Switch 1156 remains closed for only a short duration and is reopened just prior to amplifiers 1102, 1104, and 1106 being turned off. It then remains open for the rest of the measurement cycle. Preferably capacitor 1150 is a low-leakage capacitor, which is known in the art, so that it maintains its charge over the time that switch 1156 is open. In this way analog voltage 714 is maintained even while the remaining circuit elements are turned off.

Electrical power to amplifier 1110 is supplied by means of switch 1160 and miniature phone jack 214. Phone plug 1164 when inserted into phone jack 214 causes a positive voltage to be applied to the control pin on switch 1160. This closes switch 1160, causing supply voltages +Vcc and −Vcc to be applied to amplifier 1110. When phone plug 1164 is disengaged, switch 1160 opens, thereby turning off power to amplifier 1110. By controlling the delivery of electrical power to amplifier 1110 in this way, electrical power is conserved when the analog output is not in use.

It should be noted that the use of diode-connected transistors 1112 and 1114 in the present disclosure are exemplary of means for generating a voltage proportional to the logarithm of current 710. A variety of other circuit configurations are used by those skilled in the art of electronic design to obtain such logarithmic dependence, including the use of diodes rather than transistors. Therefore, the use of diode-connected transistors 1112 and 1114 should not be construed as limiting the scope of the invention.

FIG. 12 shows a schematic diagram of A/D circuit 706. The purpose of this circuit is to convert signal voltage 712 into a digital format and to display the result as a visual representation of optical power on digital displays 112 and 312. To conserve electrical power, A/D converter 1202 is powered on only during A/D conversion. Since data conversion requires only a small fraction of the measurement cycle time, considerable electrical energy is saved by powering down A/D converter 1202 between conversions.

In response to control signals Ch and Ci, A/D converter 1202 samples signal voltage 712 and compares it to reference voltage +Vr supplied by reference diode 1204 and resistor 1203. A/D converter 1202 then generates a binary representation of the voltage difference between signal voltage 712 and reference voltage +Vr and sends this data to register 1206 for storage. Data register 1206 is the "current data" register and is updated during every measurement cycle.

When control signal Ci is low, converter 1202 is powered on. Control signal Ch is a clock signal that provides timing for the data conversion and transfer process. As already noted, electrical power to A/D converter 1202 is turned on only during data conversion and transfer to register 1206.

The purpose of the remaining circuit elements in A/D circuit 706 is to convert the binary data generated by A/D converter 1202 to a format that causes digital displays 112 and 312 to display optical power in the appropriate units. This is accomplished in a two step process in which the binary data in register 1206 is first subtracted from a second set of reference data stored in memory 1208 and then decoded by means of decoder 1238 into a BCD code for input to display driver 1240.

This data conversion process begins with the loading of data into memory 1208. Memory 1208 provides reference data to be subtracted from the current data in register 1206. The origin of this reference data depends on whether the meter is operating in the dBm mode or the dB mode as selected by push-button switch 114 and flip-flop 1226.

When operating in dBm mode, the outputs of switch 114 and flip-flop 1226 are high. During each measurement cycle, data from A/D converter 1202 is serially loaded into memory 1208 in response to clock signal Ch, the latter signal being transmitted through gates 1228 and 1230. This occurs while the same data is being loaded into register 1206.

After data transfer is complete, clock signal Ch is turned off and control signal Ci goes high turning electrical power off to A/D converter 1202. However, clock signal Cg continues to clock flip-flop 1214 whose output, in response to gate 1242 being driven high, is also driven high on the next low to high transition of signal Cg. At the same time, the output of flip-flop 1216 goes high. The output of flip-flop 1214 drives the load pin on memory 1208 high. After the next low to high transition of control signal Cg, the output of flip-flop 1218 goes high, delivering a single clock signal to memory 1208 by means of gates 1228 and 1230.

At this time, reference data is loaded into memory 1208, overwriting the data that has been serially loaded. The reference data that is loaded is permanently set by a pattern of high and low voltages applied to the parallel input pins of memory 1208. The numerical value of the reference data is equal to the magnitude of the lowest optical power in the measurement range of the meter and is parallel-loaded every measurement cycle as long as the meter is operating in the dBm mode.

When switch 114 is activated by an operator to initiate the dB mode of operation, the output of switch 114 immediately goes low. However, the output of flip-flop 1226 remains high until a low-to-high transition from control signal Ci occurs. When this happens, the output of 1226 goes low, forcing gate 1230 low. Since memory 1208 can no longer receive a clock signal through gate 1230, loading of reference data into memory 1208 is blocked. Instead, the data in memory 1208 remains fixed until switch 114 is again activated by the operator, returning the meter to the dBm mode of operation.

The data that is stored in memory 1208 while in dB mode is the last data sent from A/D converter 1202 prior to initiating dB operation. Relative optical power readings are thus referenced to the optical power existing at the time switch 114 was depressed to initiate dB operation.

Having loaded the appropriate reference data into memory 1208, subtractor 1212 provides binary data at its output equal to the arithmetic difference between the data in register 1206 and memory 1208. Decoder 1238 converts the binary output of subtractor 1212 into a BCD code suitable for driving display driver 1240. In response to the data input from decoder 1238, display driver 1240 causes digital displays 112 and 312 to display optical power in the appropriate units.

Additional inputs to display driver 1240 include the output from flip-flop 1226 for controlling the dBm/dB legends on the digital displays, and control signals Ck and Ce for controlling the low-battery legend and display blanking, respectively.

The circuit elements shown in FIGS. 10–12 are all available commercially and are familiar to those skilled in the art of electronic design. In particular, all of the digital logic components can be made using series 4000 cmos devices. Clocks 1002 and 1038 of FIG. 10, can be constructed by conventional means using 4000 series nand gates (see for example, Chapter 4, "Oscillators and Waveform Generators" of Z. Meiksin and P. Thackray, *Electronic Design with Off-the Shelf Integrated Circuits*, © 1980:Parker Publishing Company, Inc., West Nyack, N.Y., page 170.

A/D converter 1202 disclosed in FIG. 12 is an LTC1285 sampling 12-bit converter manufactured by Linear Technology Corporation of Milpitas, Calif. The analog switches shown in FIGS. 10 and 11 are MAX392 quad switches manufactured by Maxim Integrated Products of Sunnyvale, Calif.

An exemplary amplifier suitable for use as operational amplifiers 1102, 1104, and 1106 in FIG. 11 is the LMC6081 operational amplifier manufactured by National Semiconductor of Santa Clara, Calif. A device suitable for use as comparator 1026 and voltage detectors 1058 and 1060 is the LP339 quad comparator, also manufactured by National Semiconductor. Amplifier 1110 of FIG. 11 is preferably a micropower operational amplifier such as a MAX406 manufactured by Maxim Integrated Products of Sunnyvale, Calif. Exemplary values for the remaining passive circuit components are as follows:

| Capacitor | Value | Capacitor | Value |
| --- | --- | --- | --- |
| 1014 | 4700 pf | 1120 | 25 pf |
| 1022 | 50 pf | 1150 | 0.01 mmf |

| Resistor | Value | Resistor | Value |
| --- | --- | --- | --- |
| 1010 | 2.2 Mohm | 1132 | 30 Kohm |
| 1018 | 1 Mohm | 1134 | 30 Kohm |
| 1028 | 100 Kohm | 1136 | ~17 Kohm |
| 1116 | 1 Kohm | 1146 | 2.2 Mohm |
| 1122 | 2.2 Mohm | 1148 | ~90 Kohm |
| 1128 | 100 Kohm | 1166 | 2 Kohm |
| 1130 | 100 Kohm | 1203 | 2 Kohm |

The preferred embodiment of the inventive in-line power meter disclosed here is powered by two 3 volt Lithium coin cell batteries and operates with a measurement cycle time of 1 second (as set by clock 1002 of FIG. 10) and an A/D clock frequency of 40 kHz (as set by clock 1038 of FIG. 10). The average electrical power consumed by the meter is less than 30 microwatts. The total mass of the meter including batteries, electrical circuits, and housing is less than 120 grams.

The preferred embodiment described here provides an analog output voltage representing optical power at phone jack 214 for measurement by an external voltmeter. Alternatively, a digital code could be presented at the same jack to be read out serially by an external digital receiver. This could easily be accomplished by connecting jack 214 to the output of the LTC1285 A/D converter.

It should be noted that the use of particular components in the present disclosure should be considered exemplary of the principles of the invention and is not intended to limit the scope of the invention to the embodiment illustrated.

Additional Embodiments

In applications where only intermittent monitoring of the optical power in a fiber is required, it may be advantageous to minimize the physical size and power consumption of the preferred embodiment of power meter 100 by eliminating A/D circuit 706 and digital displays 112, and 312.

Figure 14:
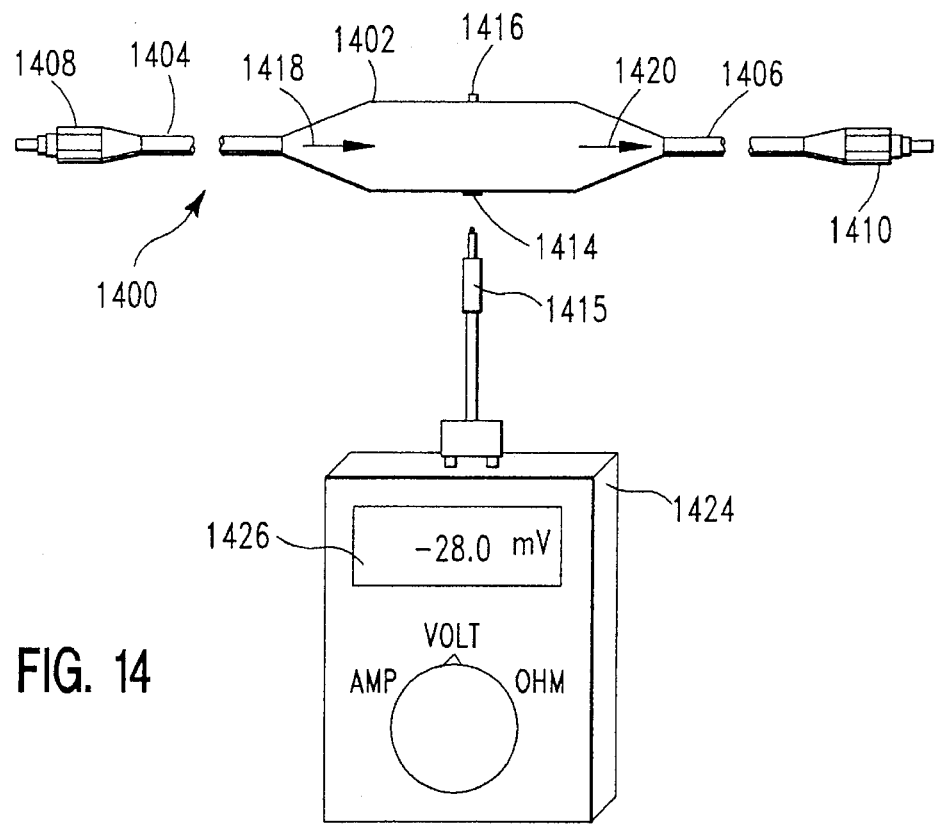
FIG. 14 pictorially shows an alternative embodiment of an in-line fiber optic power meter which embodies my inventive teachings.

FIG. 14 pictorially shows in-line power meter 1400, comprising rigid meter housing 1402, flexible fiber cable leads 1404 and 1406, attached optical connectors 1408 and 1410, sliding wavelength-selector switch 1416, arrow legends 1418 and 1420, and phone jack 1414. Operation of meter 1400 is similar to meter 100 disclosed in FIG. 1, except that digital displays 112 and 312, and switch 114 has been removed. Digital voltmeter 1424 measures the optical power exiting connector 1410 by means of an analog voltage presented at phone jack 1414. This voltage is accessed by means of phone plug 1415.

Figure 15:
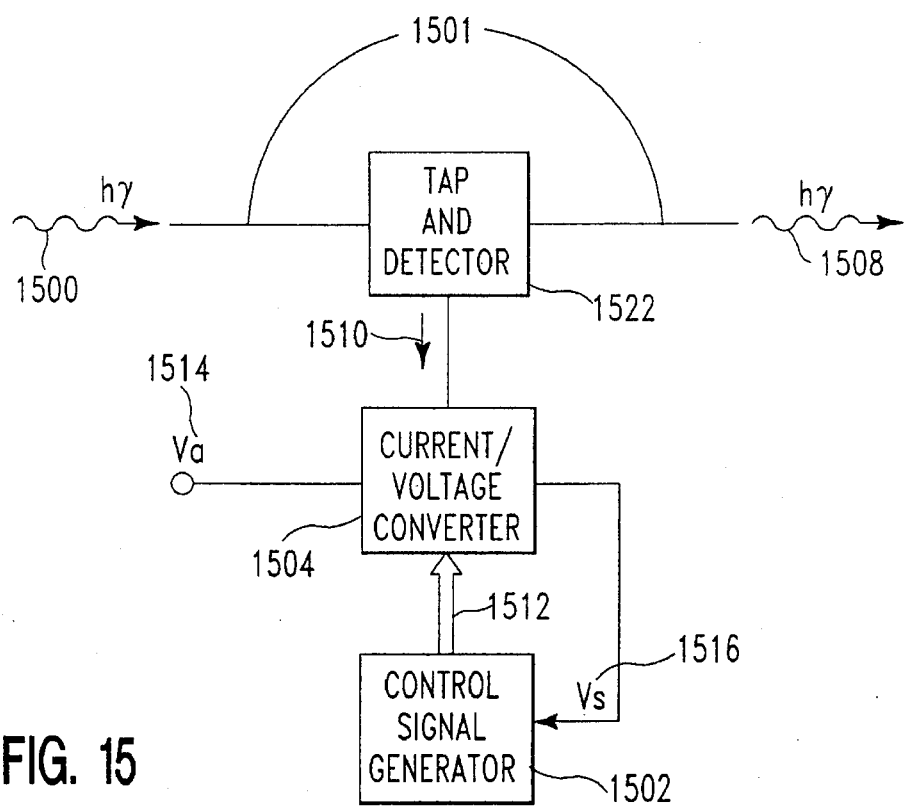
FIG. 15 is a block diagram of apparatus for measuring optical power used in power meter of FIG. 14.

FIG. 15 is a block diagram showing the operation of meter 1400 comprising optical fiber 1501, tap/detector assembly 1522, current/voltage converter 1504, and control signal generator 1502. Optical signal 1500 enters tap/detector assembly 1522 by means of optical fiber 1501. Tap/detector assembly 1522 removes a fraction of optical signal 1500 and generates an electrical current 1510 that is proportional to the power of optical signal 1500. Transmitted optical signal 1508, which represents the optical energy from signal 1500 that is not removed by tap/detector assembly 1522, travels out of tap/detector assembly 1522 and is carried away by optical fiber 1501.

Tap/detector assembly 1522 is identical in structure and operation to tap/detector assembly 602 disclosed in FIG. 8.

Current/voltage converter 1504 generates analog voltage 1514 in response to current 1510 and control signals 1512 from control signal generator 1502. Analog voltage 1514 is proportional to the logarithm of current 1510, and thus is proportional to the logarithm of optical signals 1500 and 1508. Preferably the magnitude of analog voltage 1514 is adjusted by means of current/voltage converter 1504 so that its numerical value when expressed in the units of millivolt exactly equals the numerical value of optical power in signal 1508 when the latter is expressed in the units of dBm.

Figure 16:
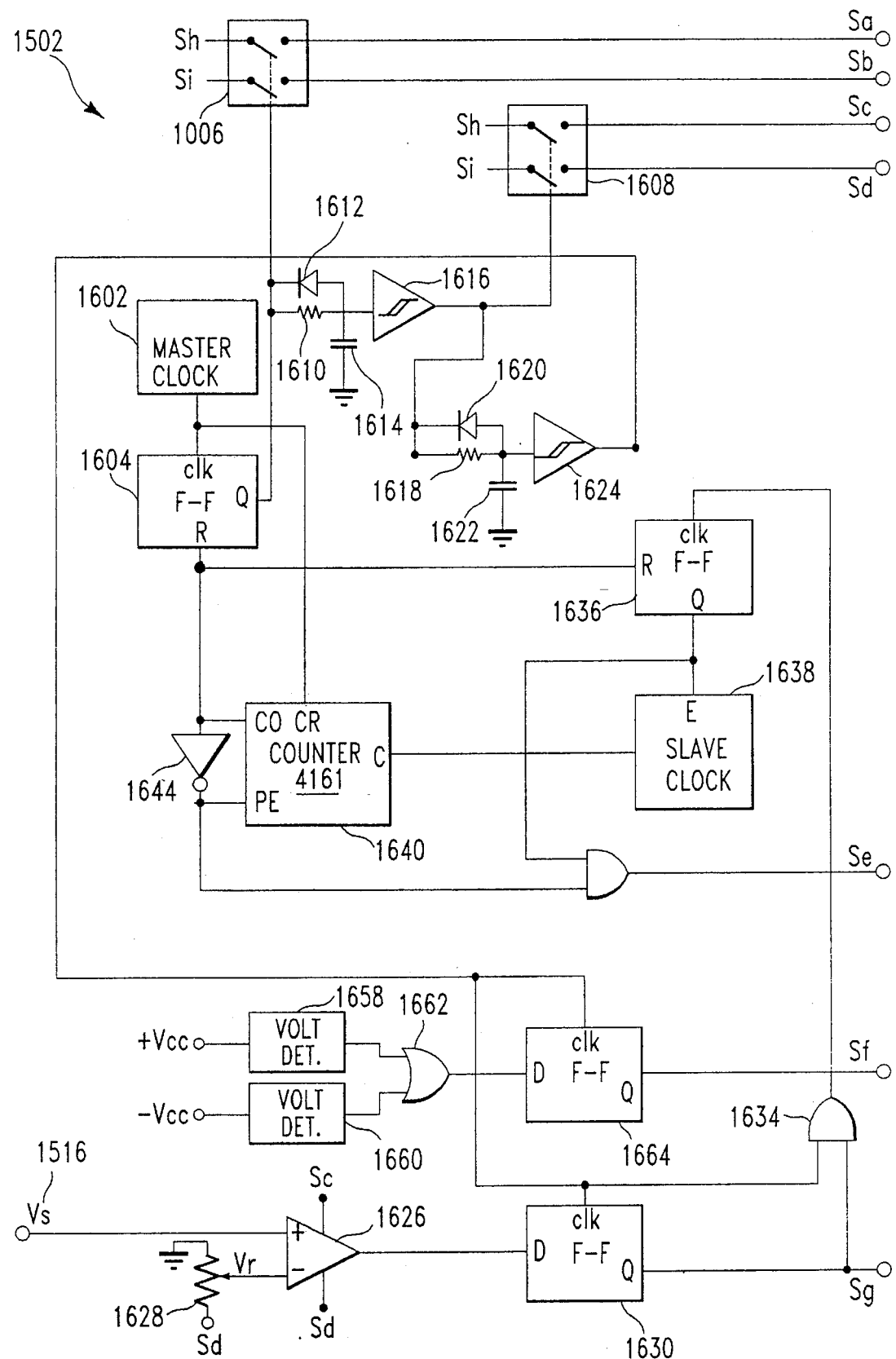
FIG. 16 is a schematic diagram of control signal generator of FIG. 15.

FIG. 16 shows a schematic diagram of control signal generator 1502 of FIG. 15 comprising master clock 1602, slave clock 1638, and counter 1640. A measurement cycle begins when the output of clock 1602 goes high driving flip-flop 1604 into a high output state. The output of flip-flop 1604 closes analog switch 1606, causing control signals Sa and Sb to assume voltage levels equal to the voltages Sh and Si, respectively.

In parallel with switch 1606, the output of flip-flop 1604 charges capacitor 1614 through resistor 1610. After a time delay determined by the RC time constant of capacitor 1614 and resistor 1610, the output of Schmitt trigger 1616 goes high closing analog switch 1608. This causes control signals Sc and Sd to assume voltage levels equal to the voltages Sh and Si, respectively. Control signals Sa and Sb, together with their time-delayed counterparts Sc and Sd, supply electrical power to current/voltage converter 1504.

After being powered on by control signals Sa, Sb, Sc, and Sd, current/voltage converter 1504 delivers signal voltage 1516 to the input of comparator 1626. Comparator 1626 compares signal voltage 1516 to reference voltage Vr to determine if optical power is present at the detector. If signal voltage 1516 exceeds reference voltage Vr, the output of comparator 1626 goes high. The output of the comparator is then clocked into flip-flop 1630 when the output of Schmitt trigger 1624 goes high following a delay time determined by the RC time constant of resistor 1618 and capacitor 1622.

The output of flip-flop 1630 drives gate 1634 high, thereby sending a clock signal to flip-flop 1636. This drives the output of 1636 high turning on clock 1638. At the same time control signal Se goes high.

The output of clock 1638 advances counter 1640 until, after a predetermined number of clock cycles, the carry output of counter 1640 goes high resetting flip-flops 1604 and 1636. This causes counting to cease by turning off clock 1638. At the same time control signal Se goes low and switches 1606 and 1608 open due to the discharge of capacitor 1614 through diode 1612.

The opening of switches 1606 and 1608 turns power off to current/voltage converter 1502. At the same time, the output of trigger 1624 is driven low by the discharge of capacitor 1622 through diode 1620. A measurement cycle is completed when the output of clock 1602 goes low resetting counter 1640. A new measurement cycle begins when the output of clock 1602 once again goes high.

The description just given applies to the case where signal voltage 1516 exceeds reference voltage Vr and the output of comparator 1626 is high. When the optical power being measured falls below a predetermined level this condition will not be met, and the output of comparator 1626 will remain low. In this case the measurement cycle is interrupted since clock 1638 is never turned on, thus saving electrical power.

Voltage detectors 1658 and 1660 are used to indicate a low battery condition. When the magnitude of either battery voltage falls below a predetermined level, the output of the corresponding voltage detector goes high driving gate 1662 high. This high state is clocked into flip-flop 1664 when Schmitt trigger 1624 goes high. At this time control signal Sf goes high.

Figure 17:
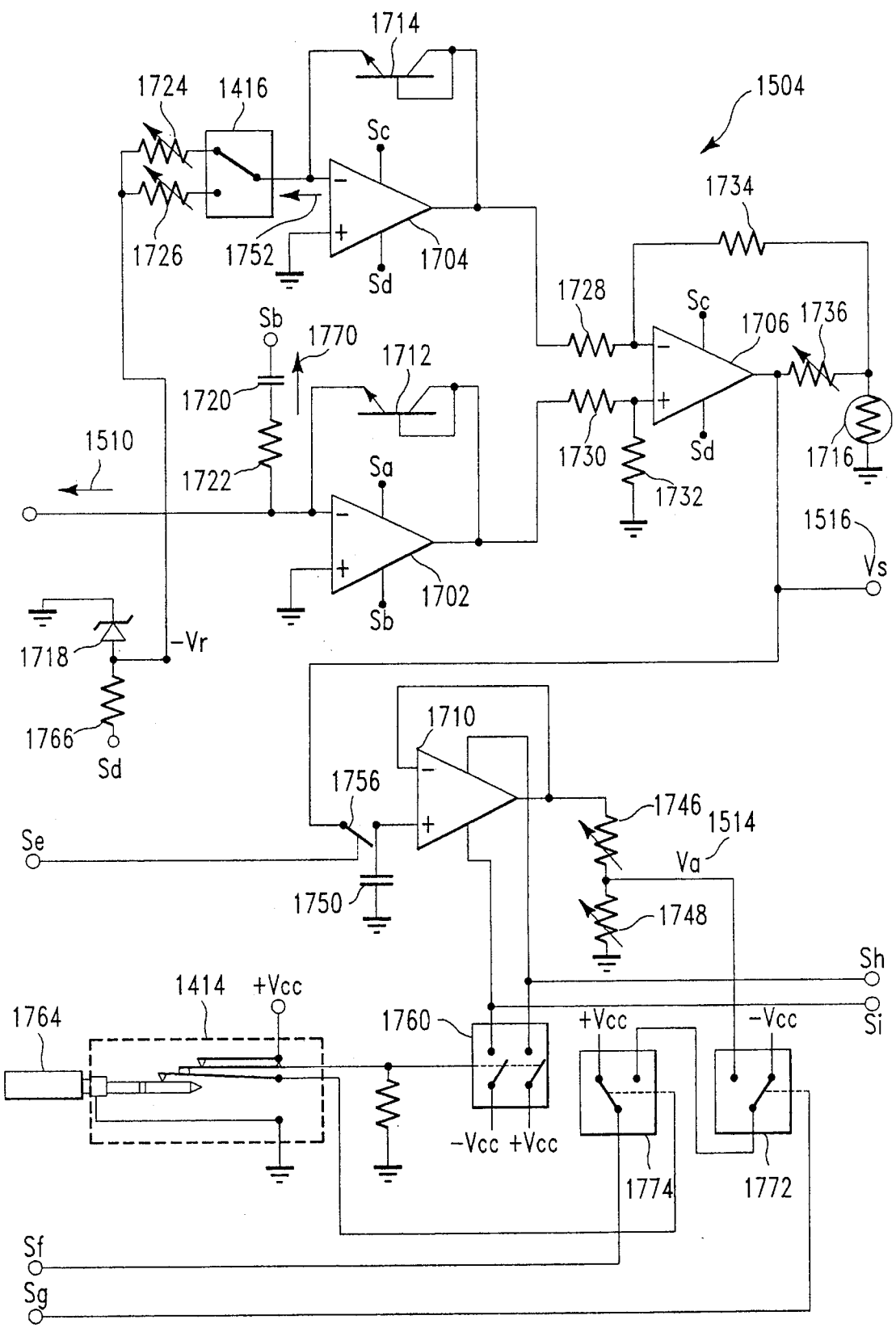
FIG. 17 is a schematic diagram of current/voltage converter of FIG. 15.

FIG. 17 shows a schematic diagram of current/voltage converter 1504 comprising operational amplifiers 1702, 1704, 1706, 1710 and matched transistors 1712 and 1714. Amplifier 1702 together with feedback transistor 1712, produces an output voltage proportional to the logarithm of current 1510. A second voltage is generated at the output of amplifier 1704 by means of reference current 1752 and feedback transistor 1714. Preferably transistors 1712 and 1714 have identical electrical and thermal characteristics. The magnitude of reference current 1752 is controlled by voltage reference diode 1718 and resistor 1766, and either resistor 1724 or 1726. One of the latter two resistors is manually selected by means of sliding switch 1416 and are adjusted to provide calibrated measurement at two preselected wavelengths.

The output voltages from amplifiers 1702 and 1704 drive a differential amplifier comprising operational amplifier 1706, thermistor 1716 and resistors 1728, 1730, 1732, 1734, and 1736. Thermistor 1716 compensates for the temperature dependence of transistors 1712 and 1714.

Signal voltage 1516, which appears at the output of amplifier 1706, is sent to a sample-and-hold circuit comprising op amp 1710, analog switch 1756, capacitor 1750, and resistors 1746 and 1748. Normally switch 1756 is open. However, when control signal Se goes high just after the output of amplifier 1706 has settled, switch 1756 closes and the voltage on capacitor 1750 is made equal to signal voltage 1516. Switch 1756 remains closed for only a short duration and is reopened just prior to amplifiers 1702, 1704, and 1706 being turned off. It then remains open for the rest of the measurement cycle. Preferably capacitor 1750 is a low-leakage capacitor so that it maintains its charge over the time that switch 1756 is open. In this way analog voltage 1514 is maintained while the remaining circuit elements are turned off.

Amplifier 1710 supplies analog voltage 1514 to phone jack 1414 by means of resistors 1746 and 1748, and switches 1772 and 1774. Under normal operation, control signals Sf and Sg are high and switches 1772 and 1774 are closed, thereby delivering analog voltage 1514 to jack 1414.

When signal voltage 1516 goes below the sensitivity of the meter, control signal Sg goes low and opens switch 1772. As a result, the negative supply voltage −Vcc is delivered to the phone jack output. Since this voltage is well outside the normal range of analog voltage 1514, the appearance of such a voltage notifies the operator that a low signal condition exists. Thus switch 1772, comparator 1626, and flip-flop 1630 comprise a low-optical-power indicating circuit.

When the magnitude of either supply voltage +Vcc or −Vcc falls below a predetermined level, control signal Sf goes low, opening switch 1774. This causes the positive supply voltage +Vcc to appear at phone jack 1414. Since this voltage is well outside the range of analog voltage 1514, the appearance of such a voltage notifies the operator that the batteries need to be replaced. Thus switch 1774, voltage detectors 1658, 1660, and flip-flop 1664 comprise a low-battery indicating circuit.

Electrical power to meter 1400 is supplied by means of switch 1760 and phone jack 1414. Phone plug 1764 when inserted into phone jack 1414 causes a positive voltage to be applied to the control pin on switch 1760. This closes switch 1760, causing control voltages Sh and Si to assume the supply voltages +Vcc and −Vcc, respectively. In addition to supplying electrical power to the amplifier circuits, control voltages Sh and Si supply electrical power to all of the digital circuits shown in FIG. 16. Thus when phone plug 1764 is disengaged, switch 1760 opens turning off all electrical power to the meter. In this way no electrical power is consumed when the meter is not in use.

Electrical power is turned on to the amplifier circuits of FIG. 17 for a time period just sufficient for their output voltages to stabilize prior to the closing of switch 1756 by control voltage Se. After capacitor 1750 has been charged, switch 1756 is opened by control signal Se, and remains open for the remainder of the measurement cycle.

According to my inventive switching technique, amplifier settling time and electrical power consumption are minimized by introducing temporary current 1770 by means of a settling circuit comprising capacitor 1720 and resistor 1722 as described previously in the discussion of FIG. 11.

In certain measurement applications where low-maintenance is a primary concern, the use of batteries in portable power meters becomes impractical because of the need to periodically replace the batteries. In these applications, my inventive measurement circuit may be used to eliminate batteries altogether when electrical power is provided by using solar cells.

Figure 18:
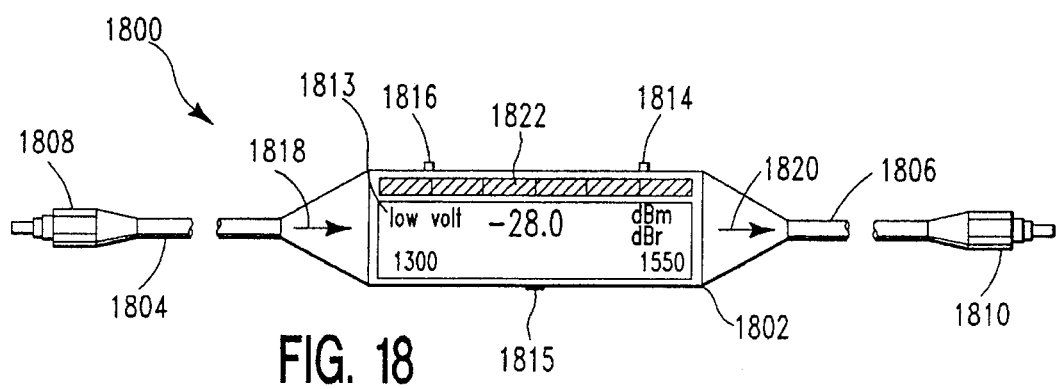
FIG. 18 is a front plan view of a solar-powered in-line fiber optic power meter which embodies my inventive teachings.
Figure 19:
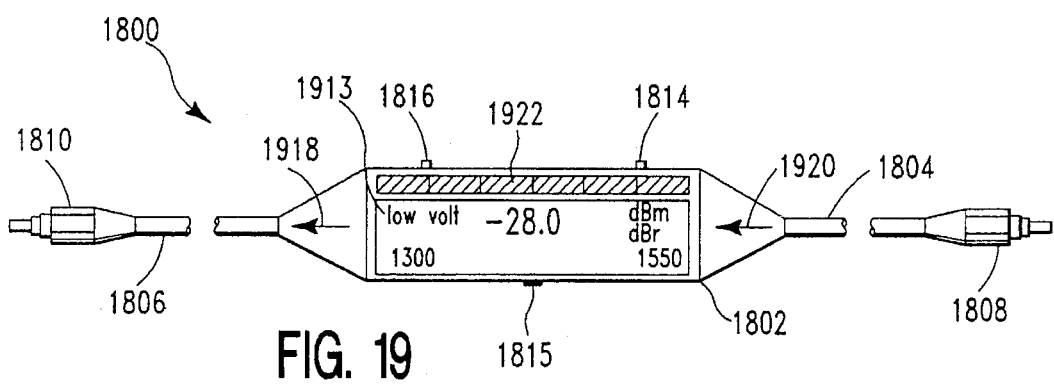
FIG. 19 is a back plan view of the power meter of FIG. 18.

FIGS. 18 and 19 pictorially show front and back plan views, respectively, of fiber optic power meter 1800 comprising rigid meter housing 1802, flexible fiber cable leads 1804 and 1806 and attached optical connectors 1808 and 1810, mode-selector switch 1814, wavelength-selector switch 1816, phone jack 1815, digital displays 1813 and 1912, arrow legends 1818, 1820, 1918, and 1920, and solar cells 1822 and 1922.

The physical design and operation of meter 1800 is similar to meter 100 shown in FIG. 1, except that electrical power is provided by solar cells 1822 and 1922. In response to ambient light, these cells provide positive and negative supply voltages +Vcc and −Vcc in place of batteries 604 and 606 shown in FIG. 6. In addition, low-voltage legends 1813 and 1913 replace low-battery legends 213 and 313 shown in FIGS. 2 and 3. Low-voltage legends 1813 and 1913 are activated when the voltage from the solar cells falls below a predetermined level, thereby notifying the operator of a low ambient light condition.

Figure 20:
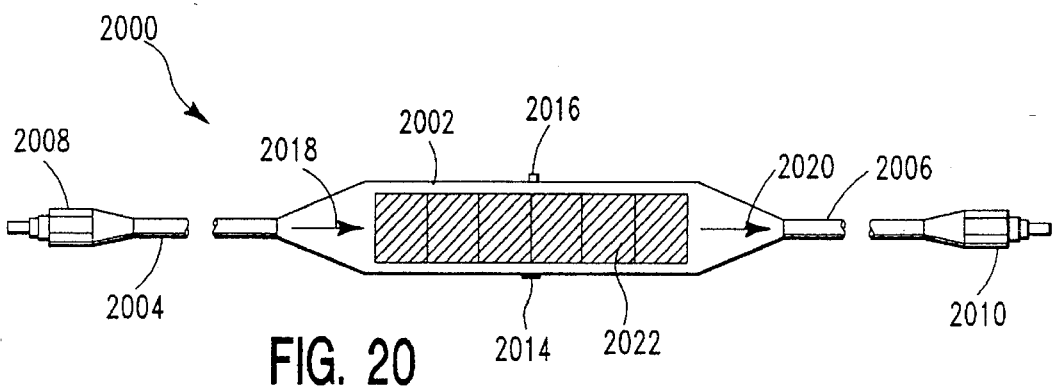
FIG. 20 is a front plan view of a solar-powered in-line power meter which also embodies my inventive teachings.
Figure 21:
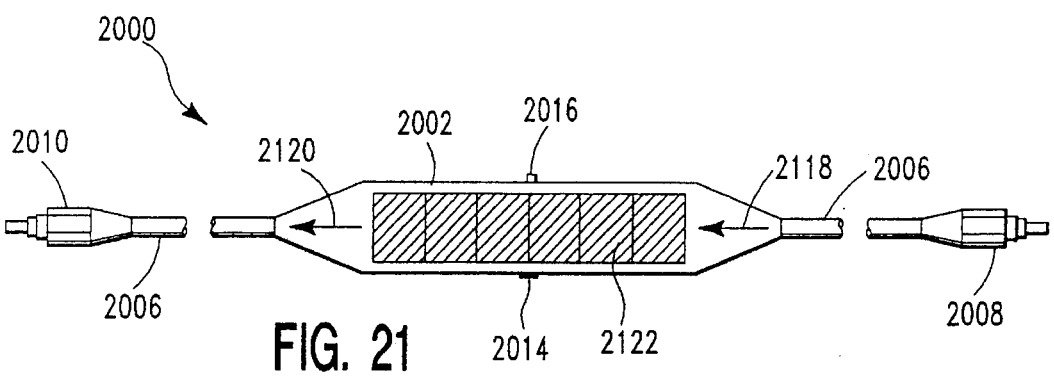
FIG. 21 is a back plan view of the power meter of FIG. 20.

FIGS. 20 and 21 pictorially show solar-powered meter 2000, comprising rigid meter housing 2002, flexible fiber cable leads 2004 and 2006 and attached optical connectors 2008 and 2010, sliding wavelength-selector switch 2016, phone jack 2014, arrow legends 2018, 2020, 2118, and 2120, and solar cells 2022 and 2122. The physical design and operation of meter 2000 is similar to meter 1400 shown in FIG. 14 except that positive and negative supply voltages are supplied by solar cells 2022 and 2122, in place of internal batteries.

In addition to in-line fiber optic power meters, the low-power operation and compact design of my inventive measurement circuit can also be advantageously applied to portable, hand-held power meters.

Figure 22:
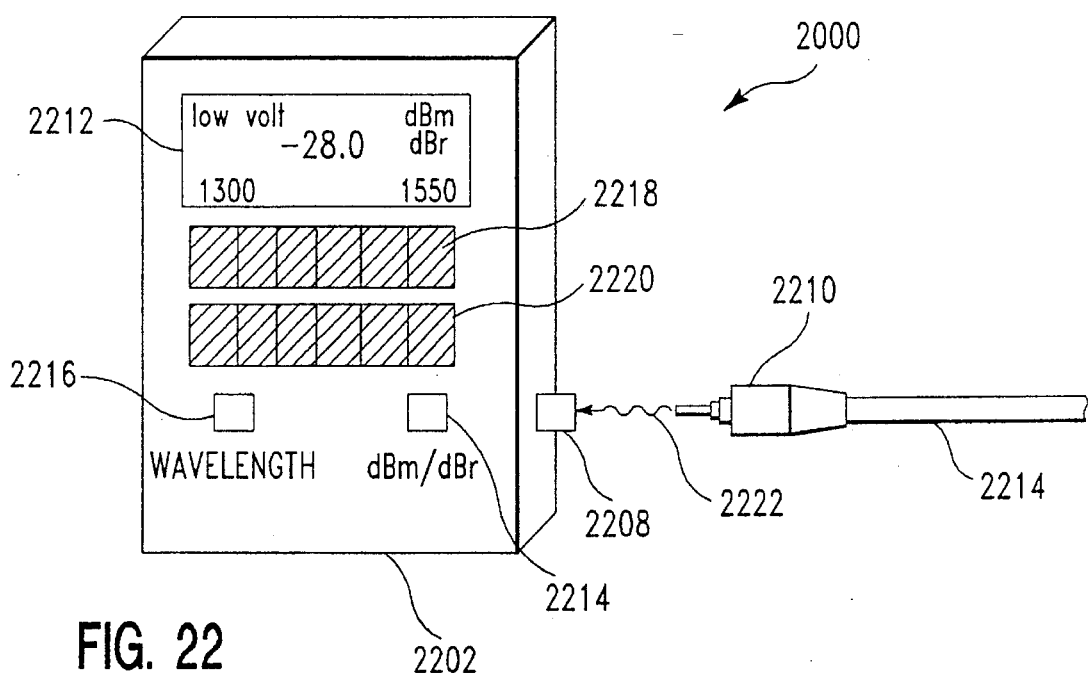
FIG. 22 pictorially shows a solar-powered hand-held optical power meter which additionally embodies my inventive teachings.

FIG. 22 pictorially shows hand-held power meter 2200, comprising rigid meter housing 2202, digital display 2212, solar cells 2218 and 2220, push-button wavelength-selector switch 2216, push-button mode-selector switch 2214, and optical connector 2208. Internal operation of meter 2200 is similar to meter 1800 shown in FIG. 18. Optical signal 2222 emerging from test fiber cable 2214 is measured by inserting cable connector 2210 into meter connector 2208. In response to optical signal 2222, an internal photodetector (not shown) generates a current proportional to the power in optical signal 2222. This current is measured by a measurement circuit identical to that used to measure current 710 of FIG. 7. The result is displayed in optical power units on digital display 2212. Electrical power is supplied to meter 2200 by solar cells 2218 and 2220.

The present invention thus provides a means for measuring and displaying the optical power carried by an optical fiber that is compact, easy to use, and suitable for long term monitoring applications in fiber optic systems. The low-power operation of my inventive measuring circuit increases battery life by orders of magnitude relative to known portable meters while reducing the physical size and weight of power supply batteries. These improvements make possible a variety of new applications including in-line fiber optic power meters, solar powered optical power meters, and portable hand-held power meters with battery life approaching the shelf-life of the batteries.

Although the descriptions given above contain many detailed specifications, these should not be construed as limitations on the scope of the invention but merely as illustrations of the presently preferred embodiment. For example, alternative embodiments could indicate the optical power being carried by a fiber using means other than a digital read out and analog voltage as described here. For example, a radio frequency signal sent by the power meter and received at a location distant from the power meter could be used to indicate optical power at the distant location. Also, alternative embodiments could use a fused-fiber coupler in place of the bent-fiber optical tap described in FIGS. 8 and 9. Additional embodiments could include measurement circuits in which some or all of the discrete electronic components shown in FIGS. 10–12 are integrated onto a single semiconductor chip. Thus the claims that follow should be used to determine the scope of the invention rather than the examples given.

I claim:

1. An apparatus for the in-line measuring of optical power being carried by an optical fiber comprising:
   a housing;
   a power source contained within said housing;
   an optical tap contained within said housing and in optical communication with said optical fiber such that optical power traversing said optical fiber is tapped off by said optical tap;
   an optical detector contained within said housing and in optical communication with said optical tap such that optical energy tapped off by said optical tap is subsequently detected by said optical detector, said optical detector producing a first current in response to the detected optical power;
   a measuring circuit contained within said housing, said measuring circuit having a current/voltage converter in electrical communication with said optical detector, said current/voltage converter producing a first voltage that is related to the detected optical power; and
   a control circuit contained within said housing and electrically connected to said measuring circuit, said control circuit comprising:
   i) a timing circuit for producing a periodic voltage signal; and
   ii) an electrically controlled switch connected to the power source for switching electrical power produced by said power source to said measuring circuit in response to said periodic voltage signal.

2. Apparatus as defined in claim 1 wherein said housing together with the power source, the optical tap, the optical detector, the measuring circuit and the control circuit has a total mass of less than 120 grams.

3. Apparatus according to claim 1 wherein said optical tap is formed by introducing a permanent microbend in an optical fiber, said microbend having a bend radius of less than 2 mm.

4. Apparatus according to claim 1 wherein said optical detector further comprises an optical filter, positioned in an optical path between said optical tap and said optical detector.

5. Apparatus according to claim 1 further comprising an A/D circuit contained within the housing and electrically connected to the measuring circuit, said A/D circuit having an A/D converter for converting said first voltage into a digital representation of said first voltage.

6. Apparatus according to claim 5 further comprising an output jack, in electrical communication with said A/D circuit, such that the digital representation of said first voltage is present at said jack.

7. Apparatus according to claim 5 further comprising one or more visual displays in electrical communication with said A/D circuit for providing a numerical indication of detected optical power.

8. Apparatus according to claim 5 further comprising a sleep circuit in electrical communication with said control circuit, said measuring circuit and said power source such that the sleep circuit disables electrical power to selected circuit elements when the detected optical power falls below a predetermined level.

9. Apparatus according to claim 1 further comprising an output jack, in electrical communication with said current/voltage converter such that said first voltage is present at said jack.

10. Apparatus according to claim 9 wherein said output jack further comprises a power switch in electrical communication with said power source such that electrical power is applied to selected circuit elements when a mated jack is inserted into the output jack.

11. Apparatus according to claim 9 further comprising a low-optical-power-indicating circuit in electrical communication with said power source and said output jack for applying an output voltage from the power source to the output jack during a pre-determined low-optical-power condition.

12. Apparatus according to claim 9 further comprising a low-battery-indicating circuit in electrical communication with said power source and said output jack for applying an output voltage from the power source to the output jack during a pre-determined low-battery-power condition.

13. Apparatus according to claim 1 wherein said power source is one selected from the group consisting of a battery and a solar cell.

14. Apparatus according to claim 1 wherein said current/voltage converter is one selected from the group consisting of a transistor and a diode.

15. Apparatus according to claim 14 further comprising a settling circuit in electrical communication with said current/voltage converter and said control circuit such that the settling circuit produces an intermittent current in said current/voltage converter in response to said periodic voltage signal from said control circuit, wherein a time duration of said intermittent current is less than a time duration during which said electrically controlled switch is closed.

16. Apparatus according to claim 15 wherein said settling circuit comprises a capacitor and resistor.

17. An apparatus for measuring the optical power being carried by an optical fiber comprising:
   a housing;
   an optical tap contained with said housing and formed by introducing a permanent microbend in said optical fiber having a bend radius of less than 2 mm such that the optical power traversing the optical fiber is tapped off by the optical tap;
   an optical detector contained within the housing and in optical communication with said optical tap such that optical energy tapped off by said optical tap is subsequently detected by said optical detector, said optical detector producing a first current in response to detected optical power; and
   wherein the total mass of said housing, said optical tap and said optical detector is less than 120 grams.

18. A low-power apparatus for sensing and displaying optical power comprising:

a housing;

a power source contained within the housing;

a measuring circuit contained within the housing, said measuring circuit having an optical detector that produces a first current in response to sensed optical power and a current/voltage converter in electrical communication with said optical detector, said current voltage/converter producing a first voltage that is related to said optical power;

an A/D circuit contained within the housing and electrically connected to said measuring circuit, said A/D circuit having an A/D converter for converting said first voltage into a digital representation of said first voltage; and a control circuit contained within the housing and electrically connected to said measuring circuit and said A/D circuit, said control circuit comprising:
i) a first timing circuit for producing a first periodic voltage signal; and
ii) an electrically controlled switch, responsive to said periodic voltage signal and connected to the power source for applying electrical power therefrom to said measuring circuit;
iii) a second timing circuit for producing a second periodic voltage signal for controlling A/D conversion of said first voltage;
iv) one or more visual displays in electrical communication with said A/D converter for providing a numerical indication of optical power sensed;

wherein said power source is one selected from the group consisting of a battery and a solar cell.

19. Apparatus according to claim 18 further comprising a settling circuit in electrical communication with said current/voltage converter and said control circuit such that the settling circuit produces an intermittent current in said current/voltage converter in response to said periodic voltage signal from said control circuit, wherein a time duration of said intermittent current is less than a time duration during which said electrically controlled switch is closed.

20. Apparatus according to claim 19 wherein said settling circuit comprises a capacitor and resistor.

21. Apparatus according to claim 18 wherein said current/voltage converter is one selected from the group consisting of a transistor and a diode.

22. Apparatus according to claim 18 further comprising an output jack, in electrical communication with said current/voltage converter such that said first voltage is present at said jack.

23. Apparatus according to claim 22 wherein said output jack further comprises a power switch in electrical communication with said power source such that electrical power is applied to said measuring circuit and said control circuit when a mated jack is inserted into the output jack.

* * * * *